US010984287B2

(12) United States Patent
Sato et al.

(10) Patent No.: US 10,984,287 B2
(45) Date of Patent: Apr. 20, 2021

(54) LEARNING DEVICE, LEARNING METHOD, AND STORAGE MEDIUM

(71) Applicant: Panasonic Intellectual Property Management Co., Ltd., Osaka (JP)

(72) Inventors: Satoshi Sato, Kyoto (JP); Takeo Azuma, Kyoto (JP); Kunio Nobori, Tokyo (JP); Nobuhiko Wakai, Tokyo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 44 days.

(21) Appl. No.: 16/399,120

(22) Filed: Apr. 30, 2019

(65) Prior Publication Data
US 2019/0347520 A1 Nov. 14, 2019

(30) Foreign Application Priority Data

May 14, 2018 (JP) .............................. JP2018-093270
Sep. 20, 2018 (JP) .............................. JP2018-176328

(51) Int. Cl.
G06K 9/62 (2006.01)
G06T 7/00 (2017.01)
(Continued)

(52) U.S. Cl.
CPC .............. G06K 9/6256 (2013.01); G06T 7/50 (2017.01); G06T 7/70 (2017.01); G06T 7/97 (2017.01); G06T 2207/10028 (2013.01)

(58) Field of Classification Search
None
See application file for complete search history.

(56) References Cited

U.S. PATENT DOCUMENTS

2017/0201674 A1* 7/2017 Yamamoto ............. H04N 5/262
2018/0089763 A1* 3/2018 Okazaki ................. G06F 16/51
2018/0295343 A1* 10/2018 Pyo ........................ G03B 35/08

OTHER PUBLICATIONS

Alex Krizhevsky et. al., "ImageNet Classification with Deep Convolutional Neural Networks", NIPS'12 Proceedings of the 25th International Conference on Neural Information Processing Systems, Dec. 2012.

(Continued)

Primary Examiner — Kevin Ky
(74) Attorney, Agent, or Firm — Wenderoth, Lind & Ponack, L.L.P.

(57) ABSTRACT

A learning device includes a memory and a processing circuit. The processing circuit: (a) obtains, from the memory, a first computational imaging image which includes an object, the first computational imaging image including a plurality of first pixels; (b) obtains, from the memory, a captured image which includes the object, the captured image including a plurality of second pixels; (c) obtains an identification result of identifying the object included in the captured image; (d) generates, with reference to correspondences between the plurality of first pixels and the plurality of second pixels, an identification model for identifying the first computational imaging image based on the identification result of identifying the object included in the captured image; and (e) outputs the identification model to an image identification device which identifies a second computational imaging image.

9 Claims, 17 Drawing Sheets

(51) Int. Cl.
    *G06T 7/50*    (2017.01)
    *G06T 7/70*    (2017.01)

(56) References Cited

OTHER PUBLICATIONS

Andreas Eitel et. al., "Multimodal Deep Learning for Robust RGB-D Object Recognition", 2015 IEEE/RSJ International Conference on Intelligent Robots and Systems (IROS), 2015, pp. 681-687.

Yusuke Oike et. al., "A 256×256 CMOS Image Sensor with ΔΣ-Based Single-Shot Compressed Sensing", 2012 IEEE International Solid-State Circuits Conference (ISSCC), Dig. of Tech. Papers, Feb. 2012, pp. 386-387.

M. Salman Asif et. al., "FlatCam: Replacing Lenses with Masks and Computation", International Conference on Computer Vision Workshop (ICCVW), Dec. 2015, pp. 663-666.

Yusuke Nakamura et. al., "Lensless Light-field Imaging with Fresnel Zone Aperture", 3rd International Workshop on Image Sensors and Imaging Systems (IWISS2016) ITE-IST2016-51, Nov. 2016, No. 40, pp. 7-8.

Michael Wakin et. al., "An Architecture for Compressive Imaging", 2006 IEEE International Conference on Image Processing (ICIP), Dec. 2006, pp. 1273-1276.

\* cited by examiner

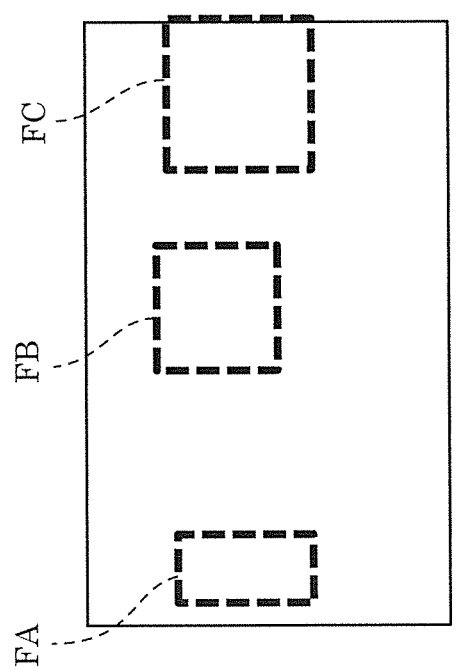

LEARNING DEVICE, LEARNING METHOD, AND STORAGE MEDIUM

CROSS REFERENCE TO RELATED APPLICATIONS

This application claims the benefit of priority of Japanese Patent Application Number 2018-093270 filed on May 14, 2018 and Japanese Patent Application Number 2018-176328 filed on Sep. 20, 2018, the entire contents of which are hereby incorporated by reference.

BACKGROUND

1. Technical Field

The present disclosure relates to a learning device, a learning method, and a storage medium.

2. Description of the Related Art

It is important for autonomously driving vehicles and robots to identify objects and to recognize environment around them. In recent years, a technique called deep learning for object identification used in the autonomously driving vehicles and the robots has been attracting attention. Deep learning is machine learning that uses a multilayered neural network, and uses a large quantity of learning data in learning. The use of such deep learning techniques has made it possible to realize identification performance that is more accurate, compared to the use of conventional methods. In such object identification, image information is particularly effective. Non-Patent Literature (NPL) 1 (Krizhevsky, A., Sutskever, I., and Hinton, G. E., 2012, "ImageNet classification with deep convolutional neural networks", NIPS'12 Proceedings of the 25th International Conference on Neural Information Processing Systems, 1097-1105) discloses the method that substantially improves the conventional object identification capacity by using deep learning that uses image information as input. In addition, in order to identify objects more accurately, input images need to be high-resolution images. Low-resolution images cannot capture, for example, distant subjects with sufficient resolution, therefore, when input images are low-resolution images, the identification performance decreases.

On the other hand, in addition to image information, NPL 2 (Eitel, Andreas, et al, 2015, "Multimodal deep learning for robust RGB-D object recognition", 2015 IEEE/RSJ International Conference on Intelligent Robots and Systems (IROS)) discloses the method that further improves the identification capacity of deep learning by inputting depth information obtained by using a three-dimensional range finder. The use of depth information makes it possible to separate a distant subject and a nearby subject. The use of the depth information also improves identification performance for the distant subject. In addition, a method for restoring a high-resolution image called compressed sensing is known, as disclosed in NPL 3 (Oike, Y. and Gamal, A. E., 2012, "A 256×256 CMOS image sensor with $\Delta\Sigma$-based single-shot compressed sensing", 2012 IEEE International Solid-State Circuits Conference (ISSCC), Dig. of Tech. Papers, 386-387), for example.

SUMMARY

However, the techniques disclosed above in NPLs 1 through 3 have a problem in simultaneously improving the accuracy and the processing speed of identifying an object using an image.

Therefore, the present disclosure provides a learning device and the like which improve the accuracy and the processing speed of identifying an object using an image.

In order to solve the problem above, an aspect of a learning device according to the present disclosure includes a memory and a processing circuit. The processing circuit: (a) obtains, from the memory, a first computational imaging image which includes an object and surrounding environment of the object, the first computational imaging image including a plurality of first pixels; (b) obtains, from the memory, a captured image which includes the object and the surrounding environment of the object, the captured image including a plurality of second pixels; (c) obtains an identification result of identifying the object and the surrounding environment of the object included in the captured image; (d) generates, with reference to correspondences between the plurality of first pixels and the plurality of second pixels, an identification model for identifying the first computational imaging image based on the identification result of identifying the object and the surrounding environment of the object included in the captured image; and (e) outputs the identification model to an image identification device which identifies a second computational imaging image.

It should be noted that a general or a specific aspect of the above may be realized by a system, a device, a method, an integrated circuit, a computer program, and a recording medium such as a computer-readable recording disk, and also by an optional combination of systems, devices, methods, integrated circuits, computer programs, and recording media. A computer-readable recording medium includes a non-volatile recording medium, such as a compact disc read-only memory (CD-ROM), for example.

According to the learning device and the like of the present disclosure, it is possible to improve the accuracy and the processing speed of identifying an object using an image.

The additional benefit and the advantage of an aspect of the present disclosure will be evident from the present specification and the drawings. This benefit and/or advantage is provided individually in various embodiments and features disclosed in the present specification and the drawings, therefore all of the embodiments and the features are not necessary for obtaining one or more benefits and/or advantages.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 8B is a schematic diagram illustrating only the identification region boxes;

DETAILED DESCRIPTION OF THE EMBODIMENTS

Figure 1:
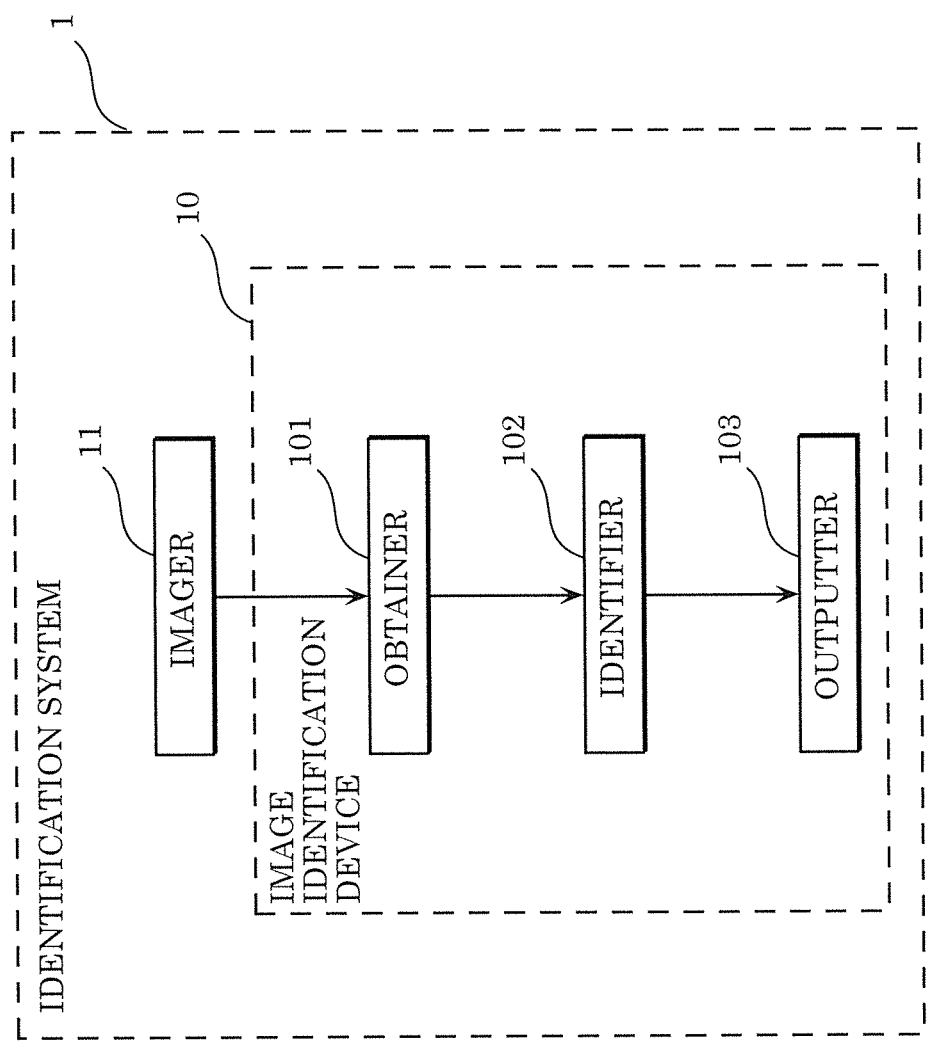
FIG. 1 is a schematic diagram illustrating an example of a functional configuration of an identification system that includes an image identification device according to an embodiment.

As indicated in BACKGROUND, the use of machine learning, such as deep learning and the like, makes it possible for machinery to realize highly accurate identification techniques. Such identification techniques have been attempted to be applied for autonomously driving vehicles and the operation of robots. Since the vehicles and the robots are mobile objects, it is necessary for the vehicles and the robots to recognize objects around them from images captured using a camera while the vehicles and the robots are moving. For this reason, there is a demand for high identification processing speed.

The techniques disclosed in NPL 1 require high-resolution images to achieve high identification accuracy. In order to obtain the high-resolution images, it is necessary to use an expensive camera, and this makes an object identification system itself expensive. In addition, it is not only an expensive camera that is needed for obtaining high-resolution images, but there may be a delay in processing due to an increase in the amount of processing the high-resolution images.

NPL 2 discloses the techniques regarding the highly accurate identification system that uses depth information. Since such a system requires an expensive three-dimensional range finder for obtaining the depth information, cost increases. Furthermore, since it is necessary to process an image and the depth information in association with each other, the amount of processing increases. Since the depth information obtained by a three-dimensional range finder includes, for example, point cloud information containing many points obtained by a scan using radar, the data size is large. That is to say, the use of such depth information obtained by a three-dimensional range finder and the like as input in addition to image information makes the network size of a neural network large and decreases the processing speed of identifying an object.

In addition, with the technology disclosed in NPL 3, the amount of processing for restoring high-resolution images from low-resolution images is huge. The inventors of the present disclosure have found the problems in the techniques disclosed in PTLs 1 through 3 as described above, and originated the following techniques that improve the accuracy and the processing speed of identifying an object.

A learning device according to an aspect of the present disclosure includes a memory and a processing circuit. The processing circuit: (a) obtains, from the memory, a first computational imaging image which includes an object and surrounding environment of the object, the first computational imaging image including a plurality of first pixels; (b) obtains, from the memory, a captured image which includes the object and the surrounding environment of the object, the captured image including a plurality of second pixels; (c) obtains an identification result of identifying the object and the surrounding environment of the object included in the captured image; (d) generates, with reference to correspondences between the plurality of first pixels and the plurality of second pixels, an identification model for identifying the first computational imaging image based on the identification result of identifying the object and the surrounding environment of the object included in the captured image; and (e) outputs the identification model to an image identification device which identifies a second computational imaging image.

Since other information, such as depth information, can be added to the computational imaging image itself, it is only necessary to use the image itself for the identification of an object. Therefore, the use of point cloud information and the like whose data size is big and which are obtained using, for example, a three-dimensional range finder is not necessary for input. For this reason, it is possible to prevent the network size of a neural network from becoming large and to improve the processing speed of identifying an object. In addition, since processing for restoring high-resolution images from low-resolution images is not necessary either, it is possible to improve the processing speed of identifying an object. Furthermore, since other information, such as depth information, can be used by using a computational imaging image, it is possible to improve the accuracy of identifying an object. Thus, it is possible to improve the accuracy and the processing speed of identifying an object using an image.

However, a person cannot visually recognize an object and the surrounding environment of the object included in a computational imaging image in the same way as visually recognizing the object and the surrounding environment of the object in a real space. Thus, when machine learning is performed using a first computational imaging image as input, it is difficult for a person to input an identification result regarding the first computational imaging image as correct identification, since the person cannot visually recognize an object and the surrounding environment of the object included in the first computational imaging image, in the same way as visually recognizing the object and the surrounding environment of the object in a real space. Accordingly, even when machine learning is performed using the first computational imaging image as input, an identification result regarding a normally captured image will be input as correct identification, since the person can visually recognize an object and the surrounding environment of the object included in a normally captured image in the same way as visually recognizing the object and the surrounding environment of the object in a real space. Since a person can visually recognize an object and the surrounding environment of the object included in a captured image in the same way as visually recognizing the object and the surrounding environment of the object in a real space, it is possible to readily obtain identification results of identifying, for example, the positions of the object and the surrounding environment of the object included in the captured image. In addition, in order to perform machine learning based on a first computational imaging image which is used as input and an identification result regarding a captured image which is different from the first computational imaging image, it is necessary to generate an identification model for identifying the first computational imaging image. For the generation of the identification model, the correspondences between positions (pixels) of an object and the surrounding environment of the object which are included in the first computational imaging image and positions (pixels) of the object and the surrounding environment of the object in a captured image need to be evident. For this reason, an aspect of the present embodiment refers to correspondences between the positions of an object and the surrounding environment of the object in the first computational imaging image and the positions of the object and the surrounding environment of the object in the captured image (specifically, correspondences between a plurality of first pixels included in the first computational imaging image and a plurality of second pixels included in the captured image).

The above-mentioned identification result may include, for example, the positions of an object and the surrounding environment of the object in a plane.

With this, an identification model is generated based on the positions of an object and the surrounding environment of the object in a plane. Accordingly, it is possible to identify the positions of the object and the surrounding environment of the object included in a second computational imaging image.

The above-mentioned identification result may include, for example, the position of an object and the surrounding environment of the object in a depth direction.

With this, an identification model is generated based on the positions of an object and the surrounding environment of the object in a depth direction. Accordingly, it is possible to identify the positions of the object and the surrounding environment of the object included in a second computational imaging image in a depth direction.

The above-mentioned identification result may include, for example, category information on categories to which an object and the surrounding environment of the object belong.

With this, an identification model is generated based on the category information of an object and the surrounding environment of the object. Accordingly, it is possible to identify the category information of an object and the surrounding environment of the object included in a second computational imaging image using the identification model. For example, it is possible to identify if the object or the like is a person, a car, a bicycle, or a traffic light.

For example, a first computational imaging image and a second computational imaging image may be images each of which includes parallax information indicating that an object and the surrounding environment of the object are superimposed multiple times. More specifically, the first computational imaging image and the second computational imaging image each are obtained by capturing an image that includes an object and the surrounding environment of the object using a multi-pinhole camera, a coded aperture camera, a light-field camera, or a lensless camera.

By superimposing an object and the surrounding environment of the object included in an image multiple times as above, it is possible to add depth information to the images.

The above-mentioned captured image may be an image obtained by capturing an image that includes an object and the surrounding environment of the object using a multi-view stereo camera.

By using a captured image obtained using a multi-view stereo camera makes it possible to estimate the position of an object and the surrounding environment of the object included in the captured image in a depth direction. Consequently, the position of the object in a depth direction which is an identification result regarding the captured image can be input as correct identification.

For example, the optical axis of a camera used for capturing a first computational imaging image and the optical axis of a camera used for capturing a captured image may substantially match. More specifically, the optical axis of a camera used for capturing the first computational imaging image and the optical axis of a camera used for capturing the captured image may match by using a beam splitter, a prism, or a half mirror.

By substantially (or perfectly) matching the optical axes as above, when converting correct identification that corresponds to the captured image to correct identification that corresponds to the first computational imaging image, it is possible to reduce a difference caused by the conversion, and thus, identification that is more accurate can be realized. This is because, a first computational imaging image and a captured image obtained by substantially matching the optical axis of a camera used for capturing the first computational imaging image and the optical axis of a camera used for capturing the captured image are images that include the same positions (environment).

A learning method according to an aspect of the present disclosure (a) obtains a first computational imaging image which includes an object and surrounding environment of the object, the first computational imaging image including a plurality of first pixels; (b) obtains a captured image which includes the object and the surrounding environment of the object, the captured image including a plurality of second pixels; (c) obtains an identification result of identifying the object and the surrounding environment of the object included in the captured image; (d) generates, with reference to correspondences between the plurality of first pixels and the plurality of second pixels, an identification model for identifying the first computational imaging image based on the identification result of identifying the object and the surrounding environment of the object included in the captured image; and (e) outputs the identification model to an image identification device which identifies a second computational imaging image.

Accordingly, it is possible to provide the learning method which improves the accuracy and the processing speed of identifying an object using an image.

The program storage medium according to an aspect of the present disclosure is a non-transitory computer-readable recording medium which stores a program for causing a computer to execute the above learning method.

Accordingly, it is possible to provide a non-transitory computer-readable recording medium which stores a program which improves the accuracy and the processing speed of identifying an object using an image.

Note that, a general or a specific aspect of the above may be realized by a system, a device, a method, an integrated circuit, a computer program, or a recording medium such as a computer-readable recording disk, and also by an optional combination of systems, devices, methods, integrated circuits, computer programs, and recording media. A computer-readable recording medium includes a non-volatile recording medium, such as a CD-ROM, for example.

Embodiment

Hereinafter, an embodiment will be described with reference to the drawings. Note that the embodiments described below each show a general or specific example. The numerical values, shapes, structural elements, the arrangement and connection of the structural elements, steps (processes), the processing order of the steps, and the like described in the following exemplary embodiments are mere examples, and thus are not intended to limit the present disclosure. In addition, among the structural elements in the following embodiments, structural elements not recited in any of the independent claims defining the most generic part of the inventive concept are described as optional structural elements. Furthermore, expressions with a word "substantially", such as substantially match, may be used to describe the following embodiments. For example, the expression "substantially match" not only indicates that things completely match, but also indicates that things approximately match. In other words, the expression also includes a difference of about several percent. The same applies to other expressions with the word "substantially". Note that the drawings are schematic diagrams, and do not necessarily provide strictly accurate illustration. Throughout the drawings, the same reference sign is given to substantially the same structural element, and redundant descriptions may be omitted or simplified.

The image identification device according to the embodiment will be described.

FIG. 1 is a schematic diagram illustrating an example of a functional configuration of identification system 1 that includes image identification device 10 according to an embodiment.

Identification system 1 includes a camera that captures a computational imaging image which includes an object and the surrounding environment of the object, and a processing circuit which identifies the object included in the computational imaging image using an identification model. The identification model and the computational imaging image will be described later. Identification system 1 includes image identification device 10 which includes a processing circuit and imager 11 as a camera. Image identification device 10 includes obtainer 101, identifier 102, and outputter 103. Identification system 1 detects a subject included in an image using the image which imager 11 obtains, and outputs a detection result. The detection of the subject included in an image is also called "identification".

Identification system 1 may be included in a mobile object, such as a vehicle and a robot, and may be included in a stationary object, such as a monitoring camera system. In the present embodiment, identification system 1 will be described as a system included in an automobile which is an example of the mobile object. In this case, the mobile object may be equipped with both imager 11 and image identification device 10. Also, the mobile object may be equipped with imager 11, but image identification device 10 may be configured outside of the mobile object. Examples of objects with which image identification device 10 may be configured include a computer device, a terminal device of an operator of the mobile object, and the like. Examples of the terminal device include a terminal device which is dedicated to the operation of the mobile object and a general-purpose mobile device, such as a smartphone, a smartwatch, a tablet, and the like. Examples of the computer device include an automotive navigation system, an engine control unit (ECU), a server device, and the like.

In the case where image identification device 10 and imager 11 are separately configured, image identification device 10 and imager 11 may communicate with each other via wired or wireless communication. The wired communication includes a wired local area network (LAN), such as a network in conformity with Ethernet (registered trademark) standard, and any other type of wired communication, for example. The wireless communication includes a third generation mobile communication system (3G), a fourth generation mobile communication system (4G), a mobile telecommunications standard for use in mobile communication systems, such as LTE (registered trademark), a wireless LAN, such as Wi-Fi (registered trademark), and short-range wireless communication, such as Bluetooth (registered trademark), ZigBee (registered trademark), for example.

Imager 11 captures or obtains a computational imaging image (an image captured using computational imaging) which includes an object and the surrounding environment of the object. More specifically, imager 11 captures (obtains) an image, as a computational imaging image, which includes parallax information indicating that an object and the surrounding environment of the object are superimposed multiple times. The computational imaging image which imager 11 obtains is also referred to as a second computational imaging image. The second computational imaging image is an image used for object identification. Note that a computational imaging image is also referred to as a computational image. For example, imager 11 may obtain a second computational imaging image in every first period which is a predetermined period, or may consecutively obtain second computational imaging images as moving images. Imager 11 may obtain a second computational imaging image which is associated with time. An example of imager 11 as hardware includes a camera, and more specifically, a multi-pinhole camera, a coded aperture camera, a light-field camera, or a lensless camera. Such cameras enable imager 11 to simultaneously obtain a plurality of images of a subject by performing an operation for capturing an image one time, as will be described later. Note that imager 11 may obtain the plurality of images mentioned above by performing an operation for capturing an image multiple times by, for example, changing the imaging area that is the light-receiving area of an image sensor included in imager 11. Imager 11 outputs a second computational imaging image obtained to obtainer 101 in image identification device 10.

Note that imager 11 may obtain not only a second computational imaging image used for identifying an object, but also a first computational imaging image used for learning, as will be described later with reference to FIG. 2, and may output the first computational imaging image obtained to first image obtainer 121 in learning device 12 (see FIG. 2).

Here, a normally captured image and a computational imaging image will be described. The normally captured image is an image captured through an optical system. In general, the normally captured image is obtained by imaging light from an object which has been condensed by the optical system. An example of the optical system includes a lens. The positional relationship of an object and an image point is called conjugation in which, by switching an object and an image point in an image and placing the object at where the image point was formed, the image point is formed at where the object was originally placed through the same optical system used before the object and the image point in an image is switched. In the present specification, an image captured in the state in which an object and an image point are in a conjugate relationship will be indicated as a normally captured image (or a captured image). When a person directly looks at an object under a condition in which the object is present, the person perceives the object in almost the same way as perceiving the object in a normally captured image. In other words, a person visually recognizes an object and the surrounding environment of the object included in a normally captured image captured using an ordinary digital camera in the same way as visually recognizing the object and the surrounding environment of the object in a real space.

On the other hand, since a computational imaging image is an image in which an object and the surrounding environment of the object are irregularly superimposed multiple times by being captured using, for example, multiple pinholes, a person cannot visually recognize the object and the surrounding environment of the object included in the computational imaging image in the same way as visually recognizing the object and the surrounding environment of the object in a real space. Although the computational imaging image may be an image in which an object and the surrounding environment of the object are visually unrecognizable by a person, the use of computer processing makes it possible to obtain information included in the image, such as the object and the surrounding environment of the object. The computational imaging image can be visualized by restoring the image so that a person can recognize the object and the surrounding environment of the object included in the image. Examples of the computational imaging image include coded images, such as a light-field image using multiple pinholes or a microlens, a compressed sensing image captured by performing weighting addition on pixel information in time and space, and a coded aperture image captured using a coded aperture and a coded aperture mask. For example, NPL 3 discloses the example of a compressed sensing image. In addition, as disclosed in NPL 4 (Asif, M. Salman, Ayremlou, Ali, Veeraraghavan, Ashok, Baraniuk, Richard and Sankaranarayanan, Aswin, 2015, "FlatCam: Replacing lenses with masks and computation", International Conference on Computer Vision Workshop (ICCVW), 663-666) and NPL 5 (Nakamura, Yusuke, Shimano, Takeshi, Tajima, Kazuyuki, Sao, Mayu and Hoshizawa, Taku, 2016, "Lensless light-field imaging with fresnel zone aperture", 3rd International Workshop on Image Sensors and Imaging Systems (IWISS2016), ITE-IST2016-51, no. 40, 7-8), another example of the computational imaging image is an image captured using a lensless camera which does not include an optical system that forms an image by refraction. Since the techniques applied to any of the above computational imaging images are known techniques, detailed description will be omitted.

A light-field image includes pixels each of which includes, for example, depth information in addition to texture information. The light field image is an image obtained by an image sensor, through a plurality of pinholes or a plurality of microlenses placed in front of the image sensor. The pluralities of pinholes or microlenses are planarly arranged along a light-receiving surface of the image sensor and in a grid form, for example. The image sensor simultaneously obtains a plurality of images through the pluralities of pinholes or microlenses by performing operation for capturing an image one time among the whole operations. The plurality of images are captured from different viewpoints. From the positional relationship between the plurality of images and the viewpoints, it is possible to obtain a range of a subject in a depth direction. Examples of the image sensor include a complementary metal-oxide semiconductor (CMOS) image sensor and a charge-coupled device (CCD) image sensor.

A compressed sensing image is an image captured using a compressed sensing technique. An example of the image captured using the compressed sensing technique is an image captured using a lensless camera. The lensless camera does not include an optical system that forms an image by refraction, and obtains an image through a mask placed in front of an image sensor. The mask includes a plurality of regions having different transmittance formed in a grid. By using such a mask, light rays (light-field images) from various directions that pass through the mask will be coded. The compressed sensing utilizes this mask information to obtain, among the coded light-field images, an image whose focus is set to a light ray in a desired direction or to an all-focused image whose focus is set in all ranges, and obtains, also, depth information.

In addition, an image captured using a camera with such a mask attached to an aperture of the camera as a diaphragm is called a coded aperture image.

As described above, computational imaging images (a first computational imaging image and a second computational imaging image) are images each of which includes parallax information indicating that an object and the surrounding environment of the object are superimposed multiple times. More specifically, the computational imaging images are images each of which is obtained by capturing an image that includes the object and the surrounding environment of the object using a multi-pinhole camera, a coded aperture camera, a light-field camera, or a lensless camera.

Obtainer 101 in image identification device 10 obtains a second computational imaging image from imager 11, and outputs the second computational imaging image to identifier 102. In addition, obtainer 101 may obtain a classifier which identifier 102 uses for identification, and may output the obtained classifier to identifier 102. When image identification device 10 is included in a mobile object, obtainer 101 may obtain, from the mobile object, the speed of the mobile object. Obtainer 101 may obtain the speed of the mobile object in real time or regularly. For example, when the mobile object is equipped with a speedometer, obtainer 101 may obtain speed from the speedometer, and when the mobile object is equipped with a computer that receives speed information from the speedometer, obtainer 101 may obtain speed from the computer. In addition, when the mobile object is not equipped with a speedometer, obtainer 101 may obtain information regarding speed from an inertial measurement unit, such as the global positioning system (GPS), an accelerometer, and an angular velocity meter, with which the mobile object is equipped.

Identifier 102 obtains a second computational imaging image from obtainer 101. Identifier 102 includes a classifier obtained from obtainer 101, for example. The classifier is an identification model for obtaining information on an object from an image, and is data used by identifier 102 for identification. The classifier is built using machine learning. Machine learning performed using a computational imaging image as learning data makes it possible to build a classifier with improved identification performance. Note that the computational imaging image used as learning data for machine learning is also called a first computational imaging image. In the present embodiment, a machine learning model applied to a classifier is a machine learning model that uses a neural network, such as deep learning, but the machine learning model may be other learning models. For example, the machine learning model may be a machine learning model using random forest or genetic programming.

Identifier 102 obtains the information on an object (an object and the surrounding environment of the object captured) in a second computational imaging image. More specifically, identifier 102 identifies the object included in the second computational imaging image, and obtains the position of the object in the second computational imaging image. In other words, the information on the object includes the presence of the object and the position of the object. The position of the object may include the position of the object included in an image in a plane and the position of the object included in the image in a depth direction. For example, identifier 102 identifies, in each of pixels, whether an object is present in at least one pixel included in a second computational imaging image using a classifier. Identifier 102 obtains the position of at least one pixel in which the presence of an object is identified as the position of the object in the second computational imaging image. In the present specification, the identification of an object includes the detection of a pixel in which the object is present in a second computational imaging image.

For example, when identification system 1 is included in an automobile, a person, an automobile, a bicycle, and a traffic light are examples of an object. Note that, identifier 102 may identify, using a second computational imaging image, one type of object or a plurality of types of objects which have been predetermined. In addition, identifier 102 may identify an object based on a category, such as a person, an automobile, and a mobile object which includes a bicycle. For the identification, a classifier that corresponds to the type (category) of an object to be identified may be used. The classifier is recorded on a memory (for example, first memory 203 which will be described later) included in image identification device 10.

For example, a light-field image includes, in addition to texture information, pixels each of which includes the depth information of a subject. In addition, as has been described in NPL 2, the use of depth information of the subject as learning data is effective in improving the identification capacity of a classifier. This enables the classifier to recognize an object in an image that has been captured small in the image as a subject which is present at a distant location, thereby preventing the classifier from recognizing the object as a garbage (in other words, ignoring the object). Accordingly, the classifier which is built based on machine learning that uses a light-field image can improve identification performance. Similarly, machine learning that uses a compressed sensing image and a coded aperture image is also effective in improving the identification performance of a classifier.

Figure 2:
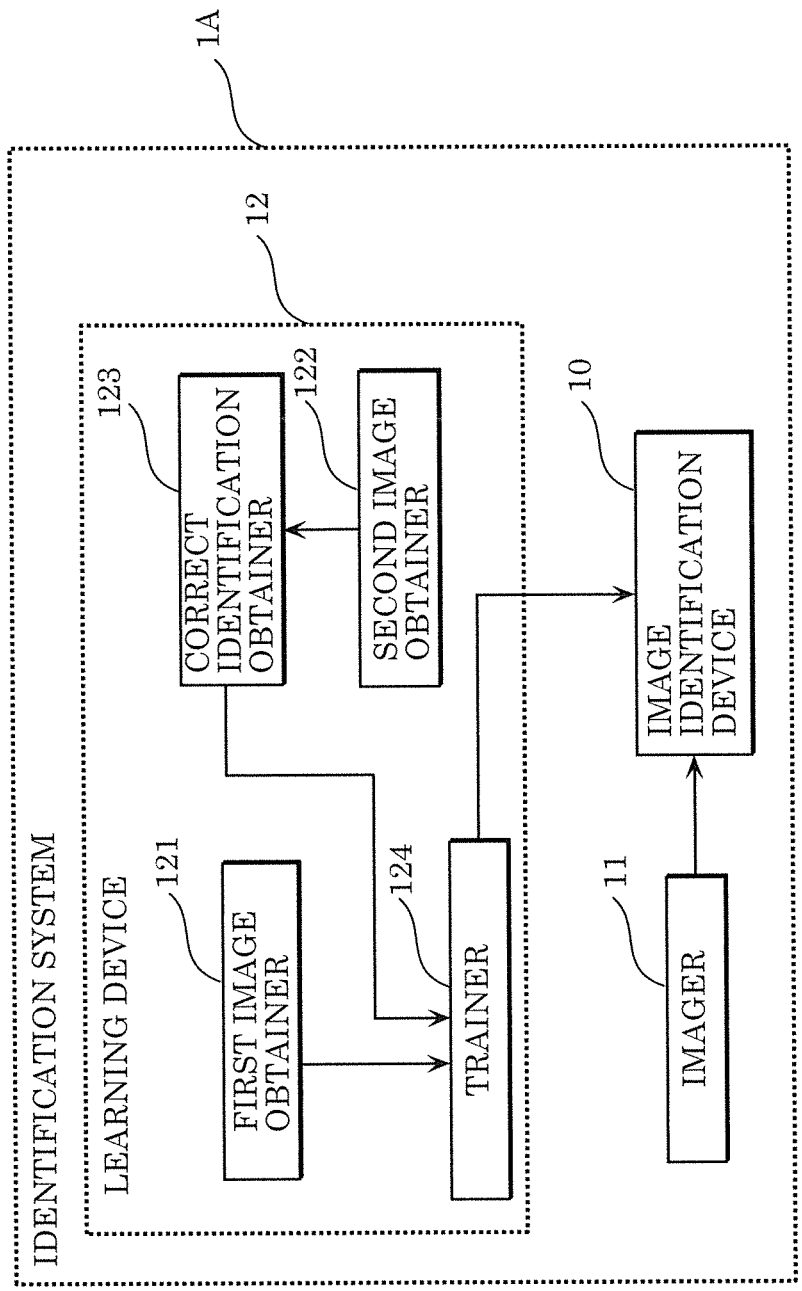
FIG. 2 is a schematic diagram illustrating an example of a functional configuration of an identification system according to a variation of the embodiment.

In addition, as illustrated in FIG. 2 which will be described later, identification system 1 may include learning device 12 for the generation of a classifier. In this case, identifier 102 in image identification device 10 uses a classifier generated in learning device 12, or in other words, a classifier that has been trained.

Outputter 103 outputs an identification result identified by identifier 102. In the case where identification system 1 further includes a display, outputter 103 outputs an instruction to the display to output the identification result. Also, outputter 103 may include a communicator, and may output the identification result via the communicator in a wired or wireless manner. As described above, the information on an object includes the presence of an object and the position of the object, and a mobile object is autonomously driven in accordance with the identification result regarding the information on an object. In addition, the information on an object output to, for example, the display enables a user to recognize the surrounding situation of the mobile object which is equipped with identification system 1.

Image identification device 10 described above which includes obtainer 101, identifier 102, and outputter 103 may be configured of a processor, such as a central processing unit (CPU) and a digital signal processor (DSP), and a processing circuit configured of a memory, such as a random access memory (RAM) and a read-only memory (ROM). The function of some or all of the structural elements above may be achieved by a CPU or a DSP executing a program stored in a ROM, using a RAM as a memory for operation. In addition, the function of some or all of the structural elements above may be achieved by a dedicated hardware circuit, such as an electronic circuit or an integrated circuit. The function of some or all of the structural elements above may be configured of the combination of the software function and the hardware circuit above.

Next, a variation of identification system 1 according to the present embodiment which includes a learning device will be described with reference to FIG. 2.

FIG. 2 is a schematic diagram illustrating an example of a functional configuration of identification system 1A according to a variation of the embodiment.

As indicated in FIG. 2, identification system 1A according to the variation includes image identification device 10, imager 11, and learning device 12. Learning device 12 includes first image obtainer 121, second image obtainer 122, correct identification obtainer 123, and trainer 124. Image identification device 10, imager 11, and learning device 12 may be included in one device or separately in different devices. In the case where image identification device 10, imager 11, and learning device 12 are included separately in different devices, information may be exchanged between the devices via wired or wireless communication. A type of wired or wireless communication applied may be any type of wired or wireless communication exemplified above.

Figure 3:
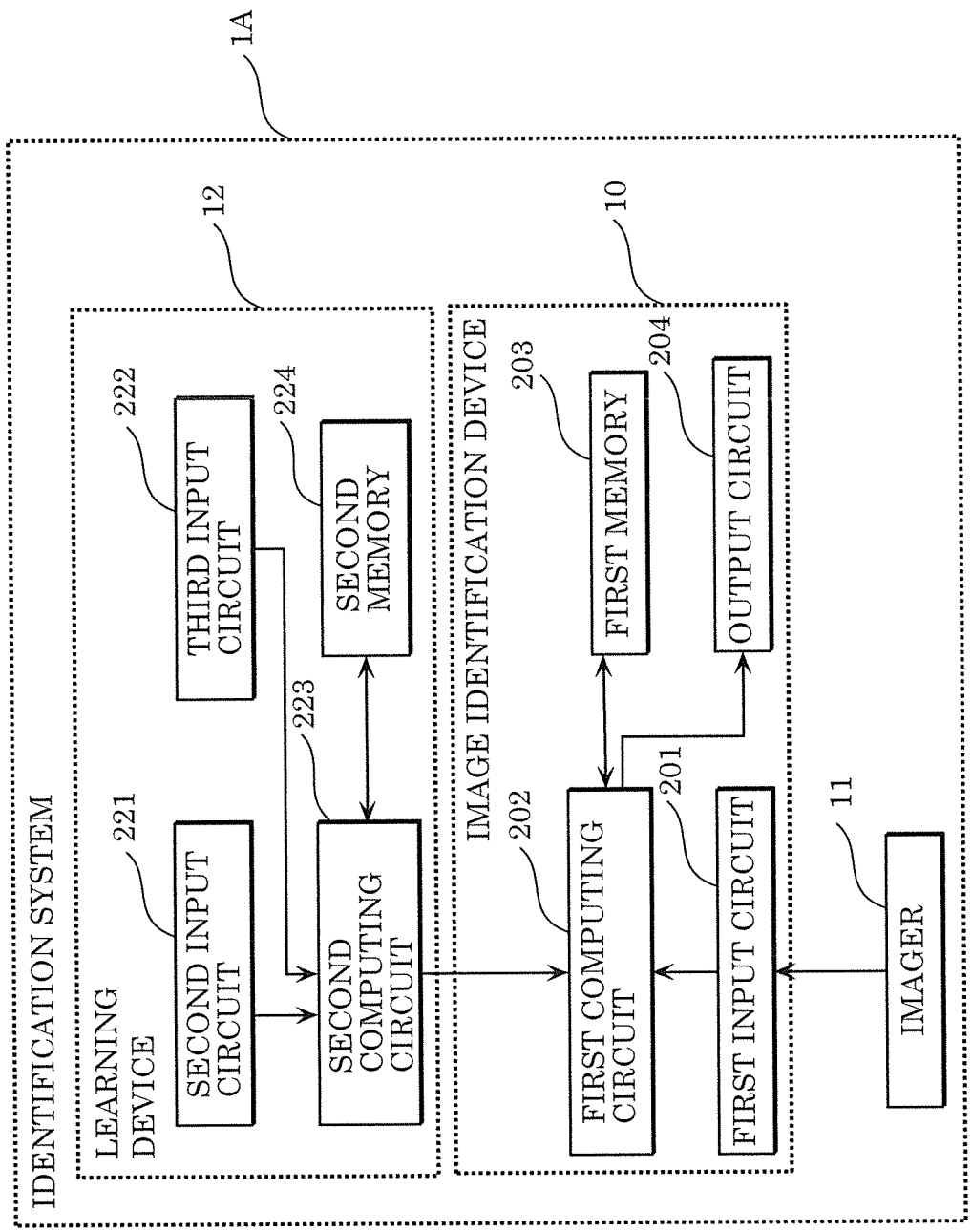
FIG. 3 is a schematic diagram illustrating an example of a hardware configuration of the identification system according to the variation of the embodiment.

FIG. 3 is a schematic diagram illustrating an example of a hardware configuration of identification system 1A according to the variation of the embodiment.

As illustrated in FIG. 3, learning device 12 includes second input circuit 221, third input circuit 222, second computing circuit 223, and second memory 224. In addition, image identification device 10 includes first input circuit 201, first computing circuit 202, first memory 203, and output circuit 204.

First input circuit 201, first computing circuit 202, and output circuit 204 are examples of a processing circuit included in image identification device 10, and first memory 203 is an example of a memory included in image identification device 10. With reference to FIG. 1 and FIG. 2, first input circuit 201 corresponds to obtainer 101. First calculation circuit 202 corresponds to identifier 102. Output circuit 204 corresponds to outputter 103. Since obtainer 101, identifier 102, and outputter 103 correspond to first input circuit 201, first computing circuit 202, and output circuit 204, respectively, as described above, obtainer 101, identifier 102, and outputter 103 can be also represented as examples of a processing circuit included in image identification device 10. First memory 203 stores, for example, (i) a computer program for first input circuit 201, first computing circuit 202, and output circuit 204 to perform processing, (ii) a second computational imaging image which obtainer 101 obtains, and (iii) a classifier which identifier 102 uses. First memory 203 may be configured as one memory or memories that include the same type or different types of memories. First input circuit 201 and output circuit 204 each may include a communication circuit.

Second input circuit 221, third input circuit 222, and second computing circuit 223 are examples of a processing circuit included in learning device 12, and second memory 224 is an example of a memory included in learning device 12. With reference to FIG. 2 and FIG. 3, second input circuit 221 corresponds to first image obtainer 121. Second input circuit 221 may include a communication circuit. Third input circuit 222 corresponds to second image obtainer 122. Third input circuit 222 may include a communication circuit. Second calculation circuit 223 corresponds to both correct identification obtainer 123 and trainer 124. Second calculation circuit 223 may include a communication circuit. Since first image obtainer 121, second image obtainer 122, and correct identification obtainer 123 and trainer 124 correspond to second input circuit 221, third input circuit 222, and second computing circuit 223 respectively as described above, first image obtainer 121, second image obtainer 122, correct identification obtainer 123, and trainer 124 can also be represented as examples of a processing circuit included in learning device 12. Second memory 224 stores, for example, (i) a computer program for second input circuit 221, third input circuit 222, and second computing circuit 223 to perform processing, (ii) a first computational imaging image which first image obtainer 121 obtains, (iii) a captured image which second image obtainer 122 obtains, (iv) correct identification which correct identification obtainer 123 obtains, and (v) a classifier which trainer 124 generates. Second memory 224 may be configured as one memory or memories that include the same type or different types of memories.

First input circuit 201, first computing circuit 202, output circuit 204, second input circuit 221, third input circuit 222, and second computing circuit 223 each may be configured of a processing circuit that includes a processor, such as a CPU or a DSP. First memory 203 and second memory 224 are realized by, for example, a semiconductor memory, such as a ROM, a RAM, and a flash memory, a hard disk drive, and a storage device, such as a solid state drive (SSD). First memory 203 and second memory 224 may be combined into one memory. The processor executes a group of instructions written in a computer program which are expanded in the memory. With this, the processor can realize various functions.

First image obtainer 121 and second image obtainer 122 in learning device 12 obtain a first computational imaging image for machine learning and a captured image, respectively. An example of first image obtainer 121 as hardware includes a camera for capturing a computational imaging image. More specifically, the camera for capturing the computational imaging image includes a multi-pinhole camera, a coded aperture camera, a light-field camera, and a lensless camera, for example. That is to say, first image obtainer 121 is realized by second input circuit 221 and the camera for capturing a computational imaging image, for example. An example of second image obtainer 122 as hardware includes a camera for capturing a captured image. More specifically, the camera for capturing a captured image includes a digital camera, for example. That is to say, second image obtainer 122 is realized by third input circuit 222 and the camera for capturing a captured image, for example.

For example, a first computational imaging image captured using a camera for capturing a computational imaging image is stored in second memory 224, and first image obtainer 121 obtains the first computational imaging image by second input circuit 221 obtaining the first computational imaging image from second memory 224. Note that first image obtainer 121 need not include a camera, as hardware, for capturing the computational imaging image. In this case, first image obtainer 121 (second input circuit 221) may obtain the first computational imaging image from imager 11 (specifically, the first computational imaging image captured using imager 11 may be obtained from second memory 224 where the first computational imaging image is stored) or from outside of identification system 1A via wired or wireless communication. A type of wired or wireless communication applied may be any type of wired or wireless communication exemplified above.

In addition, for example, a captured image captured using a camera for capturing the captured image is stored in second memory 224, and second image obtainer 122 obtains the captured image by third input circuit 222 obtaining the captured image from second memory 224. Note that second image obtainer 122 need not include a camera, as hardware, for capturing the captured image. In this case, second image obtainer 122 (third input circuit 222) may obtain the captured image from outside of identification system 1A via wired or wireless communication. A type of wired or wireless communication applied may be any type of wired or wireless communication exemplified above.

Correct identification obtainer 123 obtains correct identification for machine learning using a first computational imaging image obtained by first image obtainer 121. The correct identification may be provided from outside of identification system 1A together with the first computational imaging image, or a user may input, for example, manually to provide the correct identification. The correct identification includes category information indicating a category to which a subject in the first computational imaging image belongs and the positional information of the subject. Examples of the category of the subject include a person, an automobile, a bicycle, or a traffic light. The positional information includes a position of the subject in an image (specifically, the position of the subject in a plane or the position of the subject in a depth direction). Correct identification obtainer 123 stores, into second memory 224, obtained correct identification and the first computational imaging image in association with each other.

However, as described above, a person cannot visually recognize an object and the surrounding environment of the object included in a computational imaging image which obtainer 101 and first image obtainer 121 obtain in the same way as visually recognizing the object and the surrounding environment of the object in a real space. Therefore, it is difficult to input correct identification into the first computational imaging image obtained by first image obtainer 121. Because of this, identification system 1A of the present embodiment includes second image obtainer 122, and input correct identification to, instead of a first computational imaging image obtained by first image obtainer 121, a captured image which is obtained by second image obtainer 122 and is visually recognizable by a person as if recognizing an object and the surrounding environment of the object captured in the captured image in the same way as recognizing the object and the surrounding environment of the object in a real space. Details will be described later.

Trainer 124 trains a classifier used by identifier 102 using a first computational imaging image obtained by first image obtainer 121 and correct identification obtained by correct identification obtainer 123 which corresponds to a captured image that is obtained by second image obtainer 122. Trainer 124 causes the classifier stored in second memory 224 to perform machine learning, and stores the latest classifier that has been trained into second memory 224. Identifier 102 obtains the latest classifier stored in second memory 224, stores the latest classifier into first memory 203, and uses the latest classifier for identification processing. The above machine learning is realized using backpropagation (BP) and the like in deep learning, for example. More specifically, trainer 124 inputs the first computational imaging image to the classifier, and obtains an identification result which the classifier outputs. Then, trainer 124 adjusts the classifier such that the identification result is to be the correct identification. Trainer 124 improves identification accuracy of the classifier by repeating such adjustment to a plurality of first computational imaging images, each of which is different, and a plurality of correct identification that correspond to each of the plurality of first computational imaging images (for example, thousands of pairs).

Next, the operation of learning device 12 will be described with reference to FIG. 2 through FIG. 4.

Figure 4:
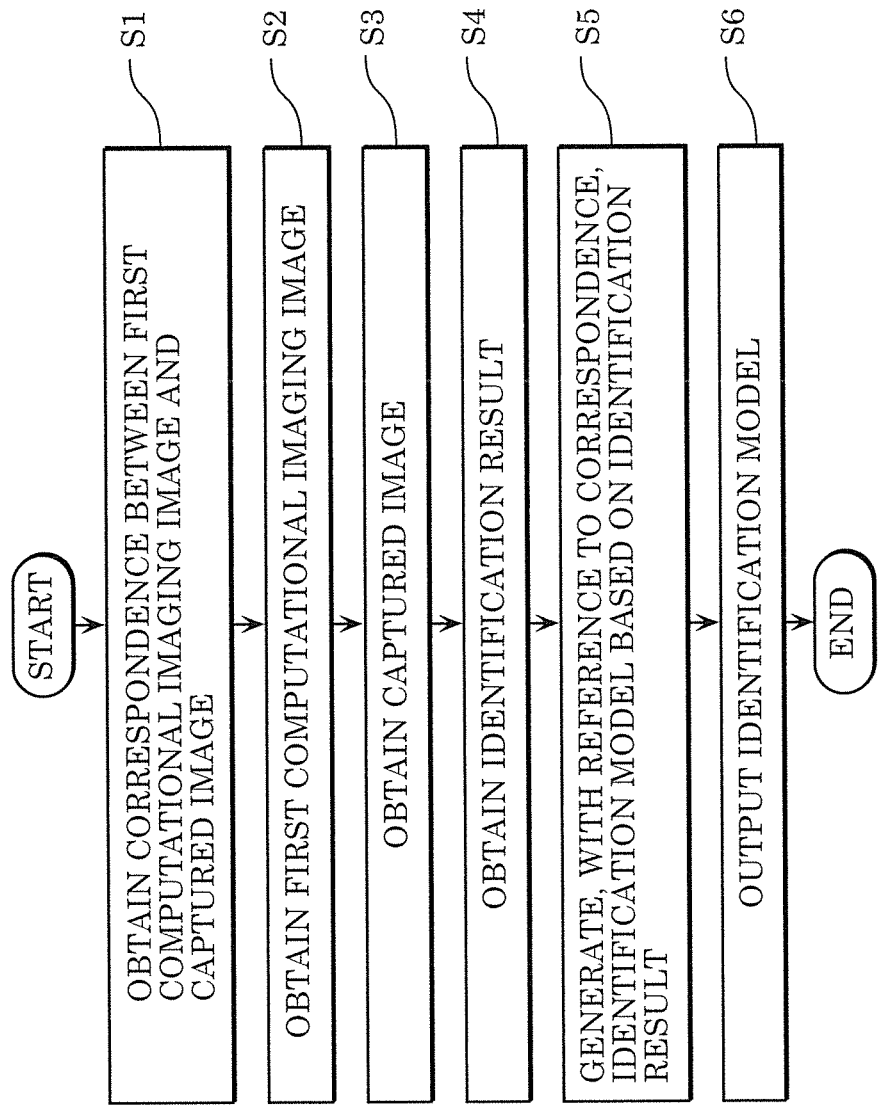
FIG. 4 is a flow chart illustrating examples of main processes performed by a learning device according to the variation of the embodiment.

FIG. 4 is a flow chart illustrating examples of main processes performed by learning device 12.

First, in step S1, trainer 124 obtains correspondences between the positions (pixels) in each of a first computational imaging image which first image obtainer 121 obtains and a captured image which second image obtainer 122 obtains. More specifically, trainer 124 obtains the correspondences between a plurality of first pixels included in the first computational imaging image and a plurality of second pixels included in the captured image. This is realized by performing geometric calibration on the first computational imaging image and the captured image. The geometric calibration obtains, in advance, where a point whose three-dimensional position is known will be captured in the first computational imaging image and the captured image, and based on the information, seek the relationship between the three-dimensional position of a subject and the first computational imaging image and between the three-dimensional position of the subject and the captured image. This can be realized by using a method known as Tsai's calibration method, for example. In general, the three-dimensional position of a subject cannot be sought from a captured image, but as mentioned above, it is possible to seek the three-dimensional position of a subject from a light-field image which is a computational imaging image. In addition, it is possible to realize the calibration by obtaining corresponding points (pixels) in the first computational imaging image which first image obtainer 121 obtains and the captured image which second image obtainer 122 obtains. For example, by obtaining the correspondences between the first computational imaging image and the captured image, origin points of the first computational imaging image and the captured image can be aligned. Note that if the positional relationship between a camera which captures the first computational imaging image and a camera which captures the captured image does not change, such a calibration is to be performed once. Hereinafter, a computational imaging image will be described as a light-field image.

A light-field image includes information on both texture information and depth information. The light-field image is captured by using a light-field camera. A specific example of a light-field camera is a camera that uses multiple pinholes or a microlens. Imager 11 is a light-field camera and first image obtainer 121 may obtain a light-field image captured by using imager 11. Also, first image obtainer 121 may obtain a light-field image from outside of identification system 1A via wired or wireless communication.

Figure 5:
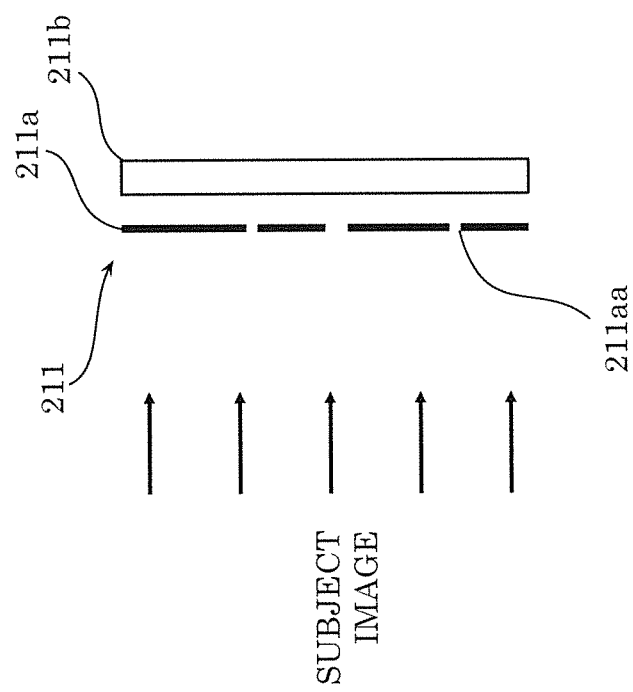
FIG. 5 is a diagram illustrating an example of a light-field camera that uses multiple pinholes.

FIG. 5 is a diagram illustrating an example of a light-field camera that uses multiple pinholes.

Light-field camera 211 illustrated in FIG. 5 includes multi-pinhole mask 211a and image sensor 211b. Multi-pinhole mask 211a is placed a certain distance away from image sensor 211b. Multi-pinhole mask 211a includes a plurality of randomly or evenly arranged pinholes 211aa. The plurality of pinholes 211aa are also called multiple pinholes. Image sensor 211b obtains the image of a subject through each of the plurality of pinholes 211aa. The image obtained through a pinhole is called a pinhole image. Since the subject included in each of pinhole images differs depending on the position and the size of each pinhole 211aa, image sensor 211b obtains a superimposed image in which the subject is superimposed multiple times. The position of pinhole 211aa affects the position of a subject projected onto image sensor 211b, and the size of pinhole 211aa affects a blur of a pinhole image. By using multi-pinhole mask 211a, it is possible to obtain a superimposed image in which a subject included in each of a plurality of pinhole images which is captured in different positions and the degree of blur is different is superimposed multiple times. When a subject is away from pinhole 211aa, the subject included in each of a plurality of pinhole images is projected at almost the same position. On the contrary, when the subject is close to pinhole 211aa, the subjects each of which is included in each of a plurality of pinhole images are projected separately. Since the amount of displacement of the subjects each included in each of the plurality of pinhole images which is superimposed multiple times corresponds to a distance between the subject and multi-pinhole mask 211a, a superimposed image includes depth information of the subject according to the amount of displacement.

Figure 6:
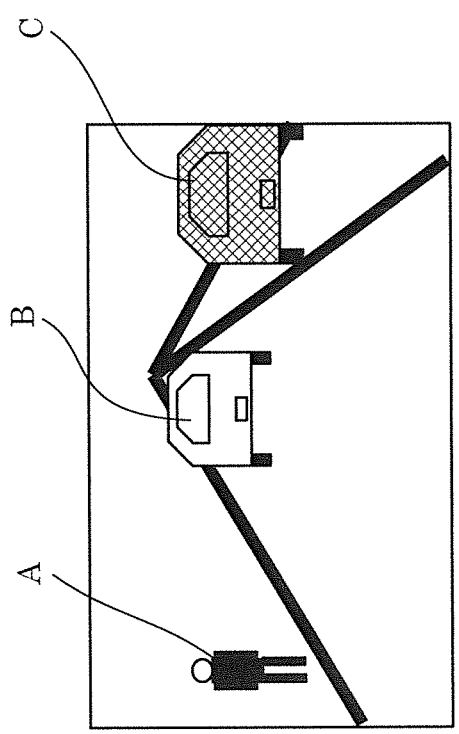
FIG. 6 is a schematic diagram illustrating an example of an image that includes subjects normally captured (captured image)
Figure 7:
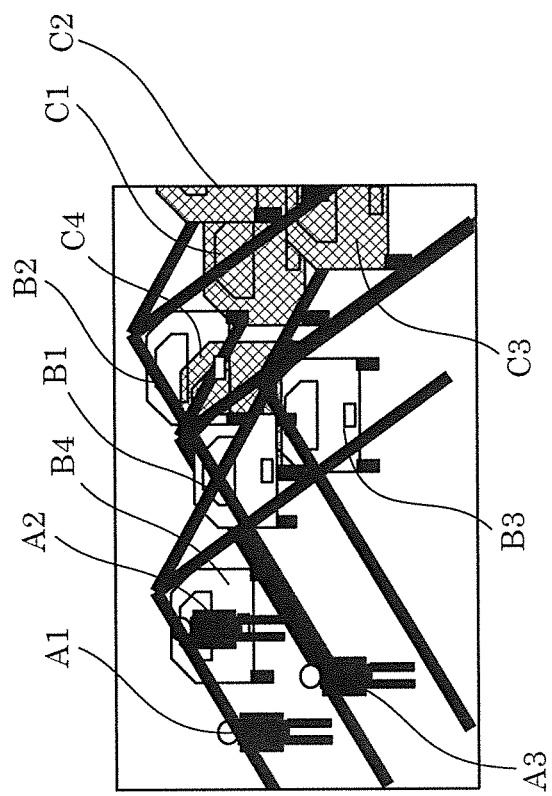
FIG. 7 is a schematic diagram illustrating an example of an image that includes the subjects captured using a light-field camera that includes a multi-pinhole mask (computational imaging image)

For example, FIG. 6 and FIG. 7 illustrate an example of a normally captured image and an example of a light-field image (computational imaging image) captured using a light-field camera that uses multiple pinholes, respectively.

FIG. 6 is a schematic diagram illustrating an example of an image that includes subjects normally captured (captured image). FIG. 7 is a schematic diagram illustrating an example of an image that includes the subjects captured using a light-field camera that includes a multi-pinhole mask (computational imaging image).

As illustrated in FIG. 6, person A and automobiles B and C on a road are pictured as subjects in a normally captured image. As illustrated in FIG. 7, when an image that includes these subjects are captured using a light-field camera which includes, for example, four pinholes, an image in which person A, automobiles B and C are superimposed multiple times is obtained. More specifically, in the image, person A is obtained as persons A1, A2, and A3, automobile B is obtained as automobiles B1, B2, B3, and B4, and automobile C is obtained as automobiles C1, C2, C3, and C4. In addition, although no reference signs are provided in FIG. 6 and FIG. 7, roads on which automobiles B or C drive in FIG. 6 will be obtained as roads which are superimposed multiple times, as illustrated in FIG. 7. As such, a computational imaging image is an image that includes parallax information indicating that objects (for example, person A and automobiles B and C) and the surrounding environment of the objects (for example, the roads) are superimposed multiple times.

As illustrated in FIG. 4, in step S2, first image obtainer 121 obtains a first computational imaging image which includes an object and the surrounding environment of the object from second memory 224, and in step S3, second image obtainer 122 obtains a captured image which includes the object and the surrounding environment of the object from second memory 224. Here, first image obtainer 121 obtains a computational imaging image which is an image in which an object and the surrounding environment of the object cannot be visually recognized by a person in the same way as visually recognizing the object and the surrounding environment of the object in a real space, and second image obtainer 122 obtains an normally captured image which is an image in which the object and the surrounding environment of the object can be visually recognized by a person in the same as visually recognizing the object and the surrounding environment of the object in a real space.

As illustrated in FIG. 4, in step S4, correct identification obtainer 123 obtains an identification result (correct identification) of identifying the object and the surrounding environment of the object which are included in the captured image obtained by second image obtainer 122. The correct identification includes category information indicating categories to which the objects and the surrounding environment of the objects (subjects, such as a person, an automobile, a bicycle, and a traffic light) belong and planar positions and regions of the objects and the surrounding environment of the objects in the image. Note that the correct identification may include the positions of the objects and the surrounding environment of the objects in a depth direction in the image. The correct identification is provided from outside of identification system 1A together with a first computational imaging image, or is provided by a user for the captured image obtained by second image obtainer 122. Correct identification obtainer 123 identifies a subject in the captured image based on the position of the subject and associates the subject with a category. As a result, correct identification obtainer 123 obtains the region of the subject, the category of the subject, and the positional information of the subject that corresponds to the captured image which is obtained by second image obtainer 122 in association with one another, and determines the information as correct identification.

Correct identification obtainer 123 uses a mark when determining the position of a subject in a plane and the region of the subject included in a captured image. For example, correct identification obtainer 123 uses, as the mark, a boundary box to enclose the subject. Hereinafter, a boundary box enclosing the subject is also called an identification region box. The identification region box can indicate the position and the region of the subject. An example of the identification region box is illustrated in FIG. 8A and FIG. 8B.

Figure 8A:
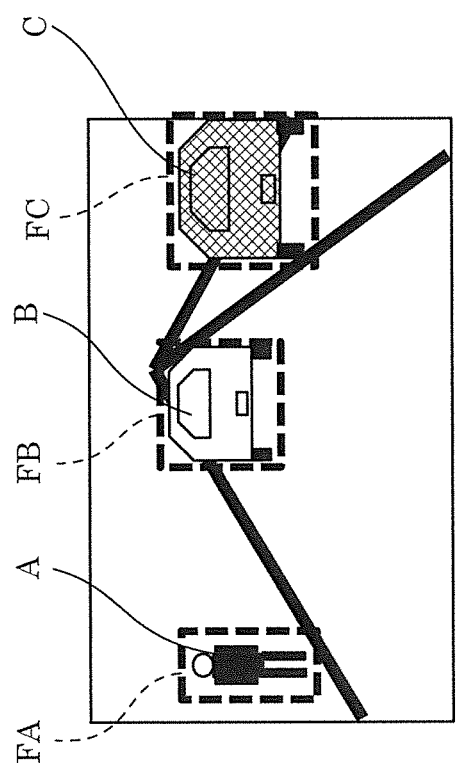
FIG. 8A is a schematic diagram illustrating the captured image in which identification region boxes are superimposed on the subjects.

FIG. 8A is a schematic diagram illustrating the captured image in which identification region boxes are superimposed on the subjects. FIG. 8B is a schematic diagram illustrating only the identification region boxes.

In examples illustrated in FIG. 8A and FIG. 8B, correct identification obtainer 123 sets, for each of the subjects, an identification region box in the shape of a quadrilateral which encloses the subject. Note that the shape of an identification region box is not limited to the examples of FIG. 8A and FIG. 8B.

In FIG. 8A and FIG. 8B, correct identification obtainer 123 sets identification region box FA to person A, identification region box FB to automobile B, and identification region box FC to automobile C. At this time, correct identification obtainer 123 may compute, as information indicating the shape and the position of an identification region box, (i) the linearity and the coordinates of the whole identification region box, (ii) the coordinates of each of the apexes of the identification region box, and (iii) coordinates of the apex of the identification region box, such as the coordinates of the upper left of the identification region box, and the length of each of sides of the identification region box. For example, as described above, the coordinates are coordinates corresponding to the origin points of a first computational imaging image and a captured image which have been aligned. As such, correct identification obtainer 123 outputs, as correct identification, information which includes, for example, the position of an object in a plane (coordinates) and the shape of the region of an identification region box. Note that, as correct identification, a captured image may be included besides the position of an object in a plane and the shape of the region of an identification region box, for example. In addition, although an identification region box is not set to the road as correct identification, an identification region box may be set to a surrounding environment, such as the road.

Furthermore, correct identification obtainer 123 need not obtain the information on an identification region box as correct identification, but may obtain correct identification for each of pixels. As illustrated in dot hatching in FIG. 9, correct identification may be masked in an image.

Figure 9:
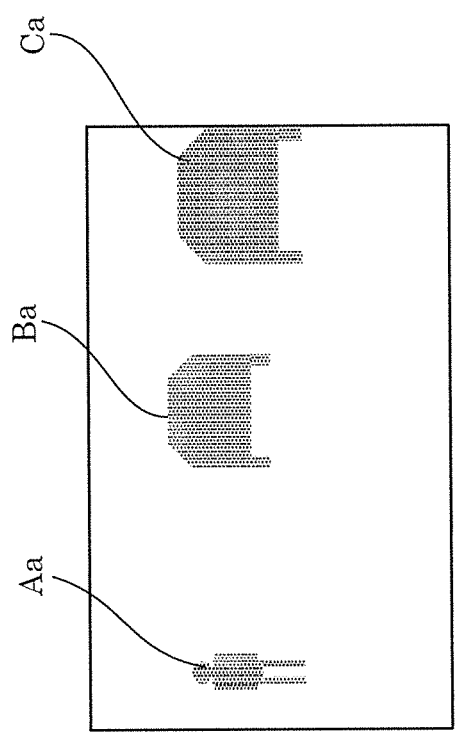
FIG. 9 is a schematic diagram illustrating examples of correct identification in which the subjects are masked.

FIG. 9 is a schematic diagram illustrating examples of correct identification in which the subjects are masked.

In the examples of FIG. 9, as correct identification, person A is provided with mask Aa and automobiles B and C are provided with masks Ba and Ca, respectively. In this manner, correct identification obtainer 123 outputs correct identification for each pixel. Note that although the road is not provided with a mask as correct identification, a surrounding environment, such as the road, may also be provided with a mask.

As illustrated in FIG. 4, in step S5, trainer 124 generates, with reference to the correspondences between the plurality of first pixels and the plurality of second pixels obtained in step S1, an identification model (classifier) for identifying a first computational imaging image based on an identification result identified from a captured image. For example, by referring to the correspondences between the plurality of second pixels included in the captured image which is illustrated in FIG. 6 and the plurality of first pixels included in the first computational imaging image which is illustrated in FIG. 7, it is possible to recognize the correspondences between the positions (each of pixels) in the captured image and the positions (each pixel) in the first computational imaging image. Accordingly, a classifier is generated as a result of machine learning performed such that correct identification regarding persons A1 and A2 and A3 included in the first computational imaging image which is illustrated in in FIG. 7 is to be the position of identification region box FA illustrated in FIG. 8B, which is an identification result identified from the captured image illustrated in FIG. 6 or the position of mask Aa illustrated in FIG. 9, and that a category is to be a person. Similarly, a classifier is generated as a result of machine learning performed such that correct identification regarding automobiles B1, B2, B3, and B4 is to be the position of identification region box FB or the position of mask Ba and that a category is to be an automobile. Also, a classifier is generated as a result of machine learning performed such that correct identification regarding automobiles C1, C2, C3, and C4 is to be the position of identification region box FC or the position of mask Ca and that a category is to be an automobile. At this time, machine learning may be performed on the positions of an object and the surrounding environment of the object in a depth direction. Although the details will be described later, the use of a multi-view stereo camera and the like as a camera for capturing a normally captured image makes it possible to readily obtain the positions of an object and the surrounding environment of the object in a depth direction, and machine learning can be performed based on the obtained positions in a depth direction.

A great number of pairs (for example, thousands of pairs) of a captured image as illustrated in FIG. 6 and a first computational imaging image as illustrated in FIG. 7 are to be prepared. Trainer 124 obtains a classifier stored in second memory 224, obtains an output result obtained by inputting the first computational imaging image to the classifier, and adjusts the classifier such that the output result is to be correct identification obtained by inputting the captured image which corresponds to the first computational imaging image. Then, trainer 124 updates the classifier in second memory 224 by storing the adjusted classifier into second memory 224.

In step S6, trainer 124 outputs an identification model (classifier) to image identification device 10 which identifies a second computational imaging image. Accordingly, image identification device 10 is allowed to identify, using the classifier generated in learning device 12, an object and the surrounding environment of the object included in the second computational imaging image which are visually unrecognizable by a person in the same way as visually recognizing the object and the surrounding object in a real space. The above will be described with reference to FIG. 1 and FIG. 10.

Figure 10:
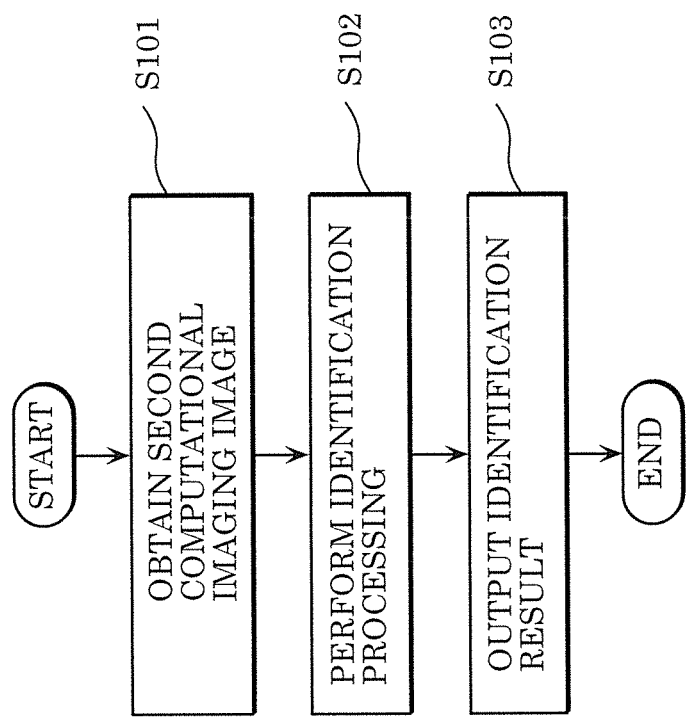
FIG. 10 is a flow chart illustrating an example of a flow of an operation of the image identification device according to the embodiment.

FIG. 10 is a flow chart illustrating an example of a flow of an operation of image identification device 10 according to the embodiment. Note that in the following, imager 11 will be described as a light-field camera.

In step S101, obtainer 101 obtains a second computational imaging image which includes an object and the surrounding environment of the object captured using imager 11 from first memory 203 (see FIG. 3). More specifically, obtainer 101 obtains a second computational imaging image as a result of first input circuit 201 obtaining the second computational imaging image from first memory 203. For example, imager 11 captures (obtains) a light-field image as the second computational imaging image in every first period that is a predetermined period, and the image is stored in first memory 203. Obtainer 101 obtains the light-field image which is captured using imager 11, and outputs the light-field image to identifier 102. Note that obtainer 101 may obtain the light-field image from outside of identification system 1 (specifically, a light-field image obtained from outside of identification system 1 is stored in first memory 203, and obtainer 101 may obtain the light-field image from first memory 203).

Next, in step S102, identifier 102 identifies the object in the second computational imaging image using a classifier stored in first memory 203. That is to say, identifier 102 detects a target object to be identified in the light-field image. The target object to be identified may be set in the classifier in advance. For example, in the case where identification system 1 is included in an automobile, examples of the target object to be identified include a person, an automobile, a bicycle, a traffic light, and the like. Identifier 102 obtains an identification result of identifying the target object to be identified from the classifier as an output result by inputting the light-field image to the classifier. The details of identification processing performed by identifier 102 will be described later. Note that identifier 102 may store the light-field image on which the identification processing has been performed in first memory 203.

Next, in step S103, outputter 103 outputs a result obtained as the result of the identification processing performed by identifier 102 (identification result). For example, outputter 103 may output image information which includes a light-field image and may output image information which does not include a light-field image. This image information may at least include the information on an object detected by identifier 102. The information on the object includes, for example, the position (the position of the object in a plane or the position of the object in a depth direction) and the region of the object. Outputter 103 may output the image information to at least one of a display and an external device included in identification system 1.

Furthermore, the identification processing performed in step S102 in FIG. 10 will be described. Image information and depth information can be simultaneously obtained from a light-field image captured using imager 11 which is a light-field camera. Identifier 102 performs identification processing on the light-field image using a classifier which has been trained in learning device 12. As described above, this learning can be realized by machine learning using a neural network, such as deep learning.

Identifier 102 may be configured to identify texture information and depth information, and to integrally identify an object included in an image using the texture information and the depth information which have been identified. Such a configuration is illustrated in FIG. 11.

Figure 11:
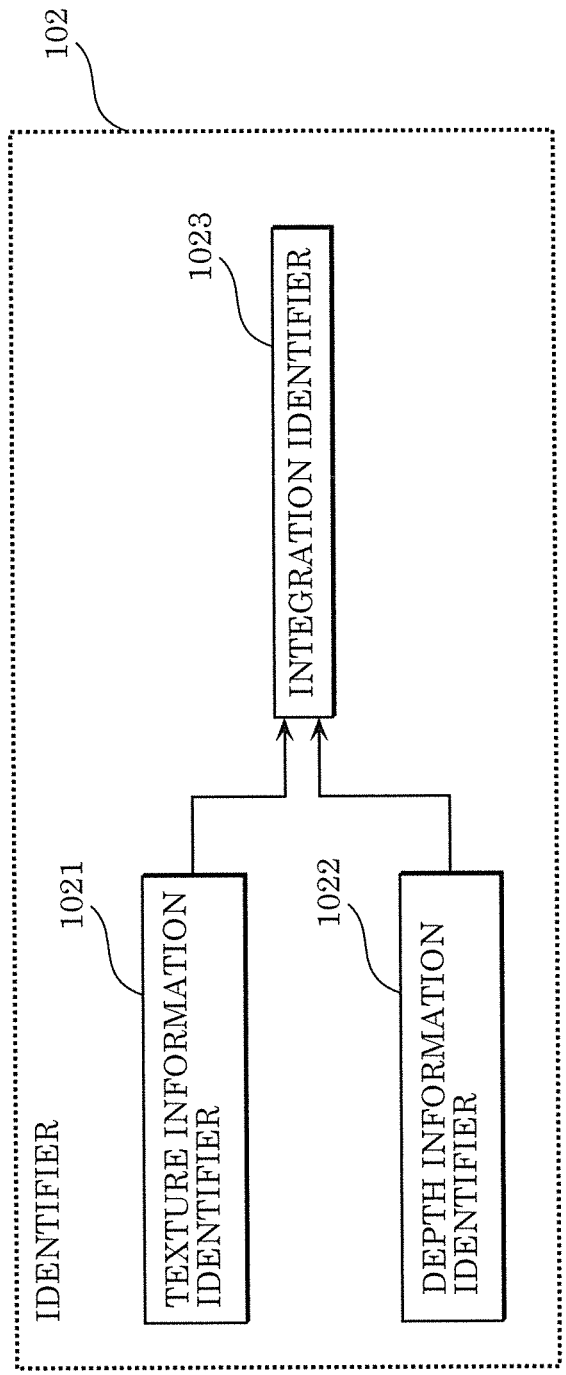
FIG. 11 is a schematic diagram illustrating an example of the functional configuration of an identifier.

FIG. 11 is a schematic diagram illustrating an example of the functional configuration of identifier 102.

As illustrated in FIG. 11, such identifier 102 includes texture information identifier 1021, depth information identifier 1022, and integration identifier 1023. Texture information identifier 1021 and depth information identifier 1022 are connected, for example, in parallel to integration identifier 1023.

Texture information identifier 1021 detects a subject included in a light-field image using texture information. More specifically, texture information identifier 1021 identifies the region (position of a subject in a plane) and the category of the subject in the light-field image using, for example, a neural network as an identifier as described in NPL 1. Information input to texture information identifier 1021 is the light-field image, and an identification result identified by texture information identifier 1021 include, as in the case of learning device 12, the region and the category of the subject in the light-field image. In the case of a normally captured image, a value of the direction of entering light ray, that is a depth value, is integrated into a pixel value; therefore, depth information is omitted. When compared with such a normally captured image, a light-field image includes more information on a subject in the image itself. For this reason, the use of a light-field image captured using multiple pinholes as information input to a classifier makes it possible to perform identification that is more accurate than the case of using a normally captured image as information input to the classifier.

Depth information identifier 1022 detects the depth information of a subject from a light-field image. More specifically, depth information identifier 1022 learns in advance, in learning device 12, the depth information of the subject which corresponds to the subject included in a light-field image. As will be described later, the depth information of the subject may be calculated by obtaining a multi-view stereo image from second image obtainer 122 or obtained from correct identification obtainer 123.

Integration identifier 1023 integrates an identification result identified by texture information identifier 1021 and an identification result identified by depth information identifier 1022, and outputs the final identification result. A classifier used by integration identifier 1023 uses, as input, the texture information or the identification result obtained by texture information identifier 1021 and depth information that is the identification result identified by depth information identifier 1022, and outputs the final identification result. The final identification result includes, for example, the region of an object included in the light-field image, the planar position of the object in the region, and the depth position of the object in the region.

Note that a neural network may be generated for each of texture information identifier 1021 and depth information identifier 1022. That is to say, for the identification of a position of an object in a plane and a category of the object, a neural network for identifying the position of the object in a plane and the category of the object is used, and for the identification of a position of the object in a depth direction, a neural network for identifying the position of the object in a depth direction, which is generated separately from the neural network for identifying the position of the object in a plane and the category of the object, may be used. In addition, the neural network for texture information identifier 1021 and the neural network for depth information identifier 1022 may be generated as an integrated neural network. That is to say, for the identification of a position of an object in a plane, a position of the object in a depth direction, and a category of the object, one neural network may be used for collectively identifying the position of the object in a plane, the position of the object in a depth direction, and the category of the object.

In addition, although the above has described imager 11 as a light-field camera which uses multiple pinholes or a microlens, imager 11 is not limited to the above. For example, imager 11 may be a configuration which captures a coded aperture image. This configuration is also a type of multi-pinhole camera.

Figure 12:
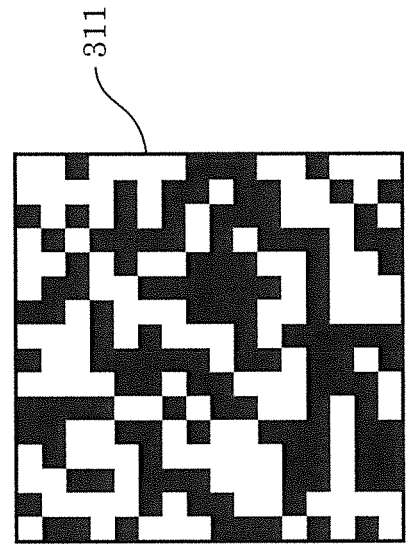
FIG. 12 is a schematic diagram of an example of a coded aperture mask that uses a random mask as a coded diaphragm.

FIG. 12 is a schematic diagram of an example of a coded aperture mask that uses a random mask as a coded diaphragm.

As illustrated in FIG. 12, coded aperture mask 311 includes light-transmitting regions which are illustrated as white-painted regions and light-blocking regions which are illustrated as black-painted regions. The light-transmitting regions and the light-blocking regions are randomly arranged. Such a coded aperture mask, like coded aperture mask 311, is produced by vapor depositing chromium onto glass. If such a coded aperture mask like coded aperture mask 311 is placed on the light path between a main lens and an image sensor, some light rays will be blocked. With this, it is possible to realize a camera which captures a coded aperture image.

In addition, second image obtainer 122 may obtain, instead of a normally captured image, an image from which depth information can be obtained in addition to image information. For example, second image obtainer 122 may be configured of a multi-view stereo camera. Second image obtainer 122 can also obtain the three-dimensional information of a subject by obtaining a multi-view stereo image.

Therefore, by calibrating in advance, an image which first image obtainer 121 obtains and an image which second image obtainer 122 obtains, it is possible to obtain a correspondence between the images after each is obtained by first image obtainer 121 and second image obtainer 122. In this calibration, the correspondences between three-dimensional coordinates which second image obtainer 122 obtain and image coordinates which first image obtainer 121 obtain are sought. Accordingly, it is possible to convert the correct identification that corresponds to a captured image which is obtained by second image obtainer 122 to the correct identification that corresponds to a first computational imaging image which is obtained by first image obtainer 121. As such, a captured image may be an image obtained by capturing an image that includes an object and the surrounding environment of the object using a multi-view stereo camera.

In the above description, correct identification includes category information indicating a category to which a subject, such as a person, an automobile, a bicycle, or a traffic light, belongs, the planar position and the region of the subject in an image, and the depth direction of the subject in the image. For example, the identification performed by identification system 1 on a position of a subject in a depth direction (depth information) as correct identification can be realized by providing, as correct identification, the position of the subject in a depth direction (depth information) which is obtained by second image obtainer 122 and sought using a multi-view stereo camera.

In addition, identifier 102 may be configured such that texture information identifier 1021 performs identification after depth information identifier 1022 extracts depth information, instead of being configured as having texture information identifier 1021 and depth information identifier 1022 connected in parallel.

Figure 13:
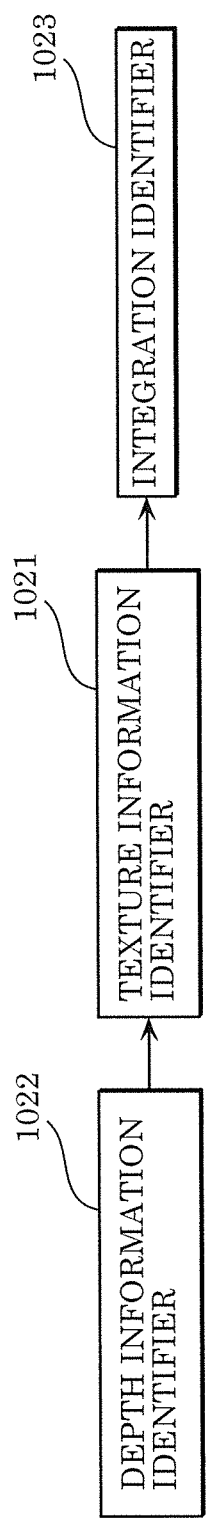
FIG. 13 is a schematic diagram illustrating another example of the functional configuration of the identifier.

FIG. 13 is a schematic diagram illustrating another example of the functional configuration of identifier 102.

As illustrated in FIG. 13, in identifier 102, depth information identifier 1022, texture information identifier 1021, and integration identifier 1023 may be connected in series. Depth information identifier 1022 generates a depth image which corresponds to a light-field image. Texture information identifier 1021 identifies the position, the region, and the category of a subject by using, for example, a neural network described in NPL 1 which uses, as input information, the depth image generated by depth information identifier 1022. Integration identifier 1023 outputs an identification result identified by texture information identifier 1021. The final identification result includes, as in the case of texture information identifier 1021 and depth information identifier 1022 being connected in parallel, the region of an object included in a light-field image, the planar position of the object in the region in the image, and the depth position of the object in the region, for example.

In addition, identifier 102 may change the configuration of a neural network according to imager 11. When imager 11 is a light-field camera, a depth image is generated using, for example, the positions and the sizes of multiple pinholes of imager 11. For example, in the case where every imager 11 includes multiple pinholes having different positions and sizes due to, for example, the variations in type and production of imager 11, the identification accuracy of identifier 102 can be improved by configuring a neural network for each imager 11 (in other words, machine learning is individually performed on each imager 11). Note that the information on positions and sizes of the multiple pinholes can be obtained by performing a camera calibration in advance.

As described above, identifier 102 uses a light-field image as input information, and performs identification processing using texture information and depth information included in the light-field image. Accordingly, compared to the identification processing performed based on a texture image using a conventional image that has been normally captured, identifier 102 is capable of performing identification processing that is more accurate, which can identify how far an object is located, for example.

The above has described identification system 1 according to the present embodiment which includes image identification device 10 including identifier 102, and identification system 1A according to the variation of the present embodiment which includes image identification device 10 and learning device 12. However, for example, identifier 102 may include learning device 12, and in this case, learning device 12 will be included in identification system 1. That is to say, in this case, identification system 1 and identification system 1A will have equivalent functions.

As described above, in identification system 1 according to the present embodiment and identification system 1A according to the variation, image identification device 10 identifies a subject included in a second computational imaging image, such as a light-field image, using the second computational imaging image. Furthermore, image identification device 10 identifies the subject included in the second computational imaging image based on texture information included in the second computational imaging image and depth information included in a computational imaging image, without restoring the second computational imaging image to a normally captured image in the course of a series of identification processing steps. Consequently, image identification device 10 can reduce the amount of identification processing performed on the subject. Particularly, as compared with a method which includes the image restoration of a second computational imaging image to a normally captured image during the identification processing, image identification device 10 makes it possible to substantially increase the speed of the identification processing. In addition, it is possible to reduce costs since the depth information can be obtained without the use of, for example, a three-dimensional range finder.

Figure 14A:
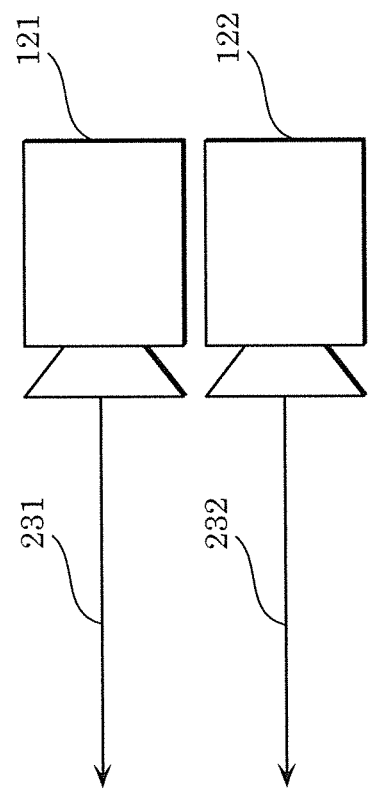
FIG. 14A is a schematic diagram which illustrates that an optical axis of a second image obtainer and an optical axis of a first image obtainer substantially match each other.

Furthermore, the optical axis of a camera (for example, first image obtainer 121) used for capturing a first computational imaging image and the optical axis of a camera (for example, second image obtainer 122) used for capturing a captured image may substantially match. FIG. 14A is a schematic diagram provided to describe the above.

FIG. 14A is a schematic diagram which illustrates that an optical axis of second image obtainer 122 and an optical axis of first image obtainer 121 substantially match each other.

In this diagram, a camera is schematically illustrated for each of first image obtainer 121 and second image obtainer 122, as an example of hardware. In addition, optical axis 231 indicates the optical axis of first image obtainer 121, and optical axis 232 indicates the optical axis of second image obtainer 122. In order to substantially match the optical axes, place first image obtainer 121 and second image obtainer 122 closely to each other, and place first image obtainer 121 and second image obtainer 122 such that the optical axes are almost in parallel with each other.

Figure 14B:
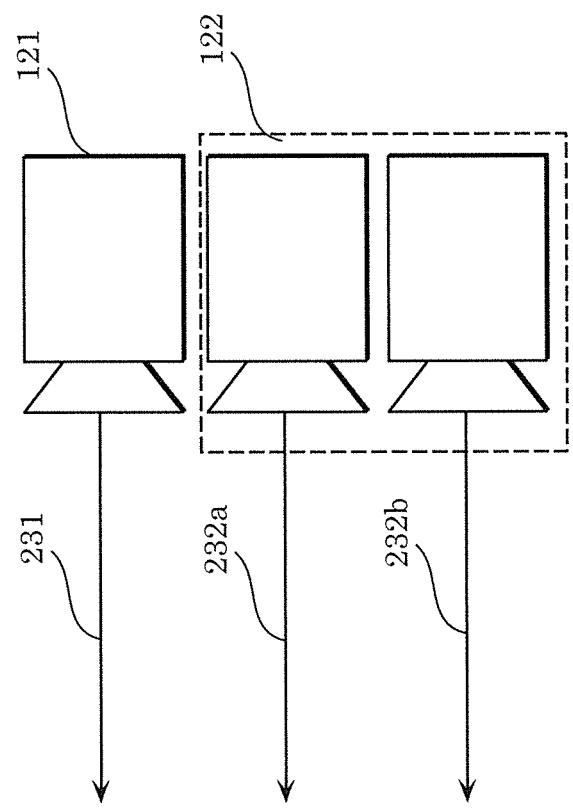
FIG. 14B is a schematic diagram which illustrates that the optical axes of a stereo camera which configures the second image obtainer and an optical axis of the first image obtainer substantially match one another.

In addition, when second image obtainer 122 is configured as a stereo camera, the optical axes of two cameras that configure second image obtainer 122 and the optical axis of first image obtainer 121 are to be substantially matched with one another. FIG. 14B is a schematic diagram provided to describe the above.

FIG. 14B is a schematic diagram which illustrates that the optical axes of a stereo camera which configures second image obtainer 122 and an optical axis of first image obtainer 121 substantially match one another.

In this diagram, the same reference sign is given to a structural element that is the same as a structural element in FIG. 14A, and the description of the structural element is omitted. In this diagram, optical axes 232a and 232b indicate the optical axes of a stereo camera which configures second image obtainer 122. As described above, although identification system 1 according to the present embodiment and identification system 1A according to the variation, convert correct identification that corresponds to a captured image which is obtained by second image obtainer 122 to correct identification that corresponds to a first computational imaging image which is obtained by first image obtainer 121, a difference caused by the conversion can be reduced by substantially matching the optical axes, and thus identification that is more accurate can be realized.

In addition, in order to match the optical axes of first image obtainer 121 and second image obtainer 122, a beam splitter, a prism, or a half mirror may be used.

Figure 15:
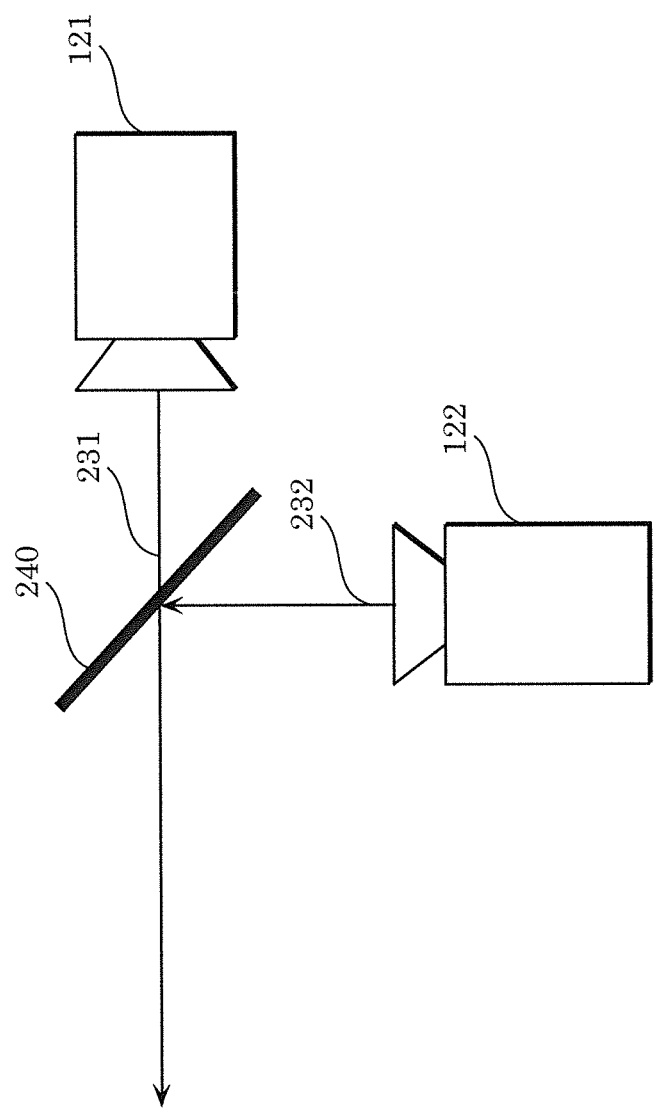
FIG. 15 is a schematic diagram which illustrates that a beam splitter is used for matching an optical axis of the first image obtainer and an optical axis of the second image obtainer.

FIG. 15 is a schematic diagram which illustrates that a beam splitter is used for matching an optical axis of first image obtainer 121 and an optical axis of second image obtainer 122.

In this diagram, the same reference sign is given to a structural element that is the same as a structural element in FIG. 14A, and the description of the structural element is omitted. Since a light ray from a subject can be split into two light rays by using beam splitter 240, it is possible to match the optical axis of first image obtainer 121 and the optical axis of second image obtainer 122 by matching one of the split light rays with optical axis 231 of first image obtainer 121 and the other split light rays with optical axis 232 of second image obtainer 122. In this way, it is possible to match the optical axis of a camera used for capturing a computational imaging image (for example, first image obtainer 121) with the optical axis of a camera used for capturing a captured image (for example, second image obtainer 122) using a beam splitter, a prism, or a half mirror.

As described above, although identification system 1 according to the present embodiment and identification system 1A according to the variation convert correct identification that corresponds to a captured image which is obtained by second image obtainer 122 to correct identification that corresponds to a first computational imaging image which is obtained by first image obtainer 121, a difference caused by the conversion can be reduced by substantially matching the optical axes, and thus identification that is more accurate can be realized.

As mentioned above, although learning device 12 of the present disclosure has been described based on the embodiments, the present disclosure is not limited to the above embodiments. Without departing from the scope of the present disclosure, various modifications which may be conceived by a person skilled in the art, and embodiments achieved by combining structural elements in different embodiments may be encompassed within the range of the present disclosure.

Although, for example, in the embodiments above, the identification of an object includes the position of the object in a plane, the position of the object in a depth direction, and the category information indicating categories of an object and the surrounding environment of the object included in a second computational imaging image, the identification is not limited to the above. For example, only, or any one or two of the position of an object in a plane, the position of the object in a depth direction, and the category information indicating categories of the object and the surrounding environment of the object may be identified. That is to say, an identification model may be generated by performing machine learning for only, or any one or two of the position of an object in a plane, the position of the object in a depth direction, and the category information indicating categories of the object and the surrounding environment of the object.

In addition, although machine learning has been performed on the position of an object in a depth direction, the machine learning need not be performed on the position of the object in a depth direction. For example, the position of an object in a depth direction may be computed using a second computational imaging image in which an object and the surrounding environment of the object are superimposed multiple times at the time when obtainer 101 obtains the second computational imaging image. That is to say, the position of the object in a depth direction may be computed directly from the second computational imaging image itself, without using an identification model.

In addition, although correct identification that corresponds to a captured image which is obtained by second image obtainer 122 is provided manually by a person, for example, the way of providing correct identification is not limited to the above. For example, correct identification may be provided using a learning model which has been prepared in advance for providing the correct identification that corresponds to a captured image obtained by second image obtainer 122.

In addition, for example, the present disclosure can be realized not only as learning device 12, but also as a learning method which includes steps (processing) performed by each structural elements that configure learning device 12.

More specifically, the learning method, as illustrated in FIG. 4, (i) obtains a first computational imaging image which includes an object and the surrounding environment of the object, the first computational imaging image including a plurality of first pixels (step S2), obtains a captured image which includes the object and the surrounding environment of the object, the captured image including a plurality of second pixels (step S3), (iii) obtains identification results of identifying the object and the surrounding environment of the object included in the captured image (step S4), (iv) generates, with reference to correspondences between a plurality of first pixels and a plurality of second pixels, an identification model for identifying the first computational imaging image based on the identification result of identifying the object and the surrounding environment of the object included in the captured image (step S5), and (V) outputs the identification model to image identification device 10 which identifies a second computational imaging image (step S6).

In addition, the steps may be performed by a computer (computer system), for example. Furthermore, the present disclosure can realize the steps included in the method as a program to be performed by the computer. Moreover, the present disclosure can realize the program as a non-transitory computer-readable recording medium, such as a CD-ROM.

In addition, in the present disclosure, all or part of a system, a device, a component, and an element, and all or part of the functional blocks of the block diagrams illustrated in the diagrams may be performed by one or more electronic circuits including a semiconductor device, a semiconductor integrated circuit (IC) or a large-scale integration (LSI).

The LSI and the IC each may be integrated into one chip or configured by combining a plurality of chips. For example, all functional blocks, except for a storage cell, may be integrated into one chip. Here, integrated circuits are called the LSI or the IC, but since how they will be called change depending on the degree of integration, the integrated circuits may be called system LSI, very large-scale integration (VLSI), or ultra large-scale integration (ULSI). It is possible to use a field-programmable gate array (FPGA) programmed after the LSI is manufactured and a reconfigurable logic device which can reconfigure a junction relationship inside the LSI or set up a circuit section inside the LSI for the same purpose.

Furthermore, the function or the operation of all or a part of a system, a device, a component, or an element can be performed by software processing, as described above. In this case, the software is recorded in at least one of non-transitory recording media, such as a ROM, an optical disk, or a hard disk drive. When the software is executed by a processor, the function specified by the software will be executed by the processor and peripheral equipment.

The system and the device may include one or more recording media, processors, and hardware devices which store the software.

In addition, all of the numbers used above, such as an ordinal and an amount, are exemplified in order to specifically describe the techniques of the present disclosure, therefore the present disclosure is not limited to the numbers exemplified. In addition, the connection relationship between structural elements is exemplified in order to specifically describe the techniques of the present disclosure, therefore the connection relationship which realizes a function of the present disclosure is not limited to the above.

In addition, division of functional blocks in each block diagram is an example, and plural functional blocks may be realized as one functional block, one functional block may be divided into plural functional blocks, or part of functions may be transferred to another functional block. Besides, single hardware or software may process, in parallel or by way of time division, functions of plural functional blocks having similar functions. Furthermore, single hardware or software may process, in parallel or by way of time division, functions of plural functional blocks having similar functions.

Identification system 1A according to an aspect of the present disclosure includes imager 11 that captures a second computational imaging image which includes information on the surrounding environment of an object, image identification device 10 which detects, using a classifier, a subject included in the second computational imaging image from the second computational imaging image, and outputs a detection result of detecting the subject from the second computational imaging image, and learning device 12 which generates the classifier. Learning device 12 is characterized in that it includes first image obtainer 121 which obtains a first computational imaging image, second image obtainer 122 which obtains a captured image, correct identification obtainer 123 which obtains correct identification regarding the captured image obtained by second image obtainer 122, trainer 124 which obtains a classifier by performing machine learning on the first computational imaging image obtained by first image obtainer 121 using the correct identification corresponding to the captured image.

Imager 11 and first image obtainer 121 each are configured of a multi-pinhole camera, a coded aperture camera, a light-field camera, or a lensless camera.

Imager 11 and first image obtainer 121 obtain, as a computational imaging image, an image which cannot be visually recognized by a person.

By using correspondences of positional relationships in images between a first computational imaging image which first image obtainer 121 obtains and a captured image which second image obtainer 122 obtains, learning device 12 learns correct identification regarding the captured image obtained by second image obtainer 122 as correct identification for first image obtainer 121.

Second image obtainer 122 obtains an image from which depth information can be obtained in addition to image information.

Second image obtainer 122 is a multi-view stereo camera.

In learning device 12, the optical axis of first image obtainer 121 and the optical axis of second image obtainer 122 substantially match.

Learning device 12 further includes a beam splitter, and the optical axes are caused to match using the beam splitter.

Learning device 12 according to an aspect of the present disclosure includes first image obtainer 121 which obtains a first computational imaging image, second image obtainer 122 which obtains a captured image, correct identification obtainer 123 which obtains correct identification regarding the captured image obtained by second image obtainer 122, trainer 124 which obtains a classifier by performing machine learning on the first computational imaging image which is obtained by first image obtainer 121 using the correct identification corresponding to the captured image.

In the learning method according to an aspect of the present disclosure, the classifier is generated by (i) detecting a subject included in a first computational imaging image from the first computational imaging image using the classifier, (ii) outputting a detection result, (iii) obtaining the first computational imaging image and a captured image, (iv) obtaining correct identification regarding the captured image, and (v) performing machine learning on the first computational imaging image using the correct identification regarding the captured image.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The techniques according to the present disclosure are widely applicable to the techniques for performing image recognition on an object included in a computational imaging image. The techniques according to the present disclosure are also widely applicable for a case in which an image-capturing device that captures a computational imaging image is included in a mobile object that requires high identification processing speed. The techniques are also applicable to, for example, autonomously driving technology for an automobile, a robot, and a periphery monitoring camera system.

What is claimed is:

1. A learning device comprising:
a memory; and
a processing circuit, wherein
the processing circuit:
(a) obtains, from the memory, a first computational imaging image which includes a first object and surrounding environment of the first object, the first computational imaging image including a plurality of first pixels, the first computation imaging image being an image that is visually unrecognizable by a person, and the first computation imaging image including parallax information indicating that the first object and the surrounding environment of the first object are superimposed multiple times;
(b) obtains, from the memory, a captured image which includes the first object and the surrounding environment of the first object, the captured image including a plurality of second pixels, and the captured image being an image that is visually recognizable by a person;
(c) obtains an identification result of identifying the first object and the surrounding environment of the first object included in the captured image;
(d) generates, with reference to correspondences between (i) the plurality of first pixels included in the first computational imaging image that is visually unrecognizable by a person and (ii) the plurality of second pixels included in the captured image that is visually recognizable by a person, an identification model for identifying the first computational imaging image based on the identification result of identifying the first object and the surrounding environment of the first object included in the captured image, the identification result includes category information indicating categories to which the first object and the surrounding environment of the first object belong; and
(e) outputs the identification model to an image identification device which identifies, in a second computation imaging image, a position of a second object belonging to the same category as the first object, according to whether, for each of pixels of the second computational imaging image, the second object is present in at least one pixel in the second computational imaging image, the second computation imaging image being an image that is visually unrecognizable by a person, and the second computation imaging image including parallax information indicating that the second object and the surrounding environment of the second object are superimposed multiple times.

2. The learning device according to claim 1, wherein the identification result includes positions of the first object and the surrounding environment of the first object in a plane.

3. The learning device according to claim 1, wherein the identification result includes positions of the first object and the surrounding environment of the first object in a depth direction.

4. The learning device according to claim 1, wherein the first computational imaging image is obtained by capturing an image that includes the first object and the surrounding environment of the first object using a multi-pinhole camera, a coded aperture camera, a light-field camera, or a lensless camera, and
the second computational imaging image is obtained by capturing an image that includes the second object and the surrounding environment of the second object using the multi-pinhole camera, the coded aperture camera, the light-field camera, or the lensless camera.

5. The learning device according to claim 1, wherein
the captured image is obtained by capturing an image of that includes the first object and the surrounding environment of the first object using a multi-view stereo camera.

6. The learning device according to claim 1, wherein
an optical axis of a camera used for capturing the first computational imaging image and an optical axis of a camera used for capturing the captured image match.

7. The learning device according to claim 6, wherein
the optical axis of the camera used for capturing the first computational imaging image and the optical axis of the camera used for capturing the captured image are caused to match by using a beam splitter, a prism, or a half mirror.

8. A learning method, comprising:
(a) obtaining a first computational imaging image which includes a first object and surrounding environment of the first object, the first computational imaging image including a plurality of first pixels, the first computation imaging image being an image that is visually unrecognizable by a person, and the first computation imaging image including parallax information indicating that the first object and the surrounding environment of the first object are superimposed multiple times;
(b) obtaining a captured image which includes the first object and the surrounding environment of the first object, the captured image including a plurality of second pixels;
(c) obtaining an identification result of identifying the object and the surrounding environment of the object included in the captured image, and the captured image being an image that is visually recognizable by a person;
(d) generating, with reference to correspondences between (i) the plurality of first pixels included in the first computational imaging image that is visually unrecognizable by a person and (ii) the plurality of second pixels included in the captured image that is visually recognizable by a person, an identification model for identifying the first computational imaging image based on the identification result of identifying the first object and the surrounding environment of the first object included in the captured image, the identification result includes category information indicating categories to which the first object and the surrounding environment of the first object belong; and
(e) outputting the identification model to an image identification device which identifies, in a second computation imaging image, a position of a second object belonging to the same category as the first object, according to whether, for each of pixels of the second computational imaging image, the second object is present in at least one pixel in the second computational imaging image, the second computation imaging image being an image that is visually unrecognizable by a person, and the second computation imaging image including parallax information indicating that the second object and the surrounding environment of the second object are superimposed multiple times.

9. A non-transitory computer-readable recording medium for use in a computer, the recording medium having a computer program recorded thereon for causing the computer to execute the learning method according to claim 8.

* * * * *